United States Patent
Tomiya et al.

(10) Patent No.: US 7,356,352 B2
(45) Date of Patent: Apr. 8, 2008

(54) MOBILE TERMINAL APPARATUS

(75) Inventors: Wataru Tomiya, Yokohama (JP); Ken Muramatsu, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/536,662

(22) PCT Filed: Nov. 13, 2003

(86) PCT No.: PCT/JP03/14468

§ 371 (c)(1),
(2), (4) Date: May 27, 2005

(87) PCT Pub. No.: WO2004/051487

PCT Pub. Date: Jun. 17, 2004

(65) Prior Publication Data

US 2006/0014529 A1   Jan. 19, 2006

(30) Foreign Application Priority Data

Nov. 29, 2002 (JP) .............................. 2002-348218

(51) Int. Cl.
*H04B 1/38* (2006.01)
(52) U.S. Cl. ................. 455/557; 455/556.1; 455/552.1
(58) Field of Classification Search .. 455/414.1–414.4, 455/552.1–553.1, 556.1, 557
See application file for complete search history.

(56) References Cited

U.S. PATENT DOCUMENTS 7,031,746 B2 * 4/2006 Na et al. ................. 455/550.1

2003/0050050 A1 * 3/2003 Higuchi et al. ............ 455/414

FOREIGN PATENT DOCUMENTS

| CN | 200380104611.0 A1 | 11/2002 |
|---|---|---|
| JP | 8255606 | 10/1996 |
| JP | 9-321845 | 12/1997 |
| JP | 11-15762 | 1/1999 |
| JP | 11-213015 | 8/1999 |
| JP | 2001-14210 | 1/2001 |
| JP | 2001-101116 | 4/2001 |
| JP | 2001-346174 | 12/2001 |
| WO | 01/73569 A1 | 10/2001 |

* cited by examiner

*Primary Examiner*—Temica Beamer
(74) *Attorney, Agent, or Firm*—Pearne & Gordon LLP

(57) ABSTRACT

A mobile terminal apparatus, even when performing a radio communication, can acquire information from a site in a predetermined network at predetermined time intervals, thereby allowing the user to easily obtain his desired information when he needs it. A control part (11) has an access procedure setting part (21) capable of arbitrarily setting an access to a particular site in a network in accordance with a user's instruction, and an access executing part (22) for executing, in accordance with the access setting, a predetermined procedure to access the particular site and acquire data therefrom at a set time. A memory (12) has an access procedure storing part (23) for storing, as a macro type of program, a series of procedures based on the access setting, and a data storing part (24) for storing the data acquired from the particular site. Even when there occurs a trouble inherent in the mobile terminal apparatus, such as a blind spot or the like, a processing is performed based on an access setting to allow the mobile terminal apparatus performing a radio communication to perform an automatic cyclic operation.

8 Claims, 15 Drawing Sheets

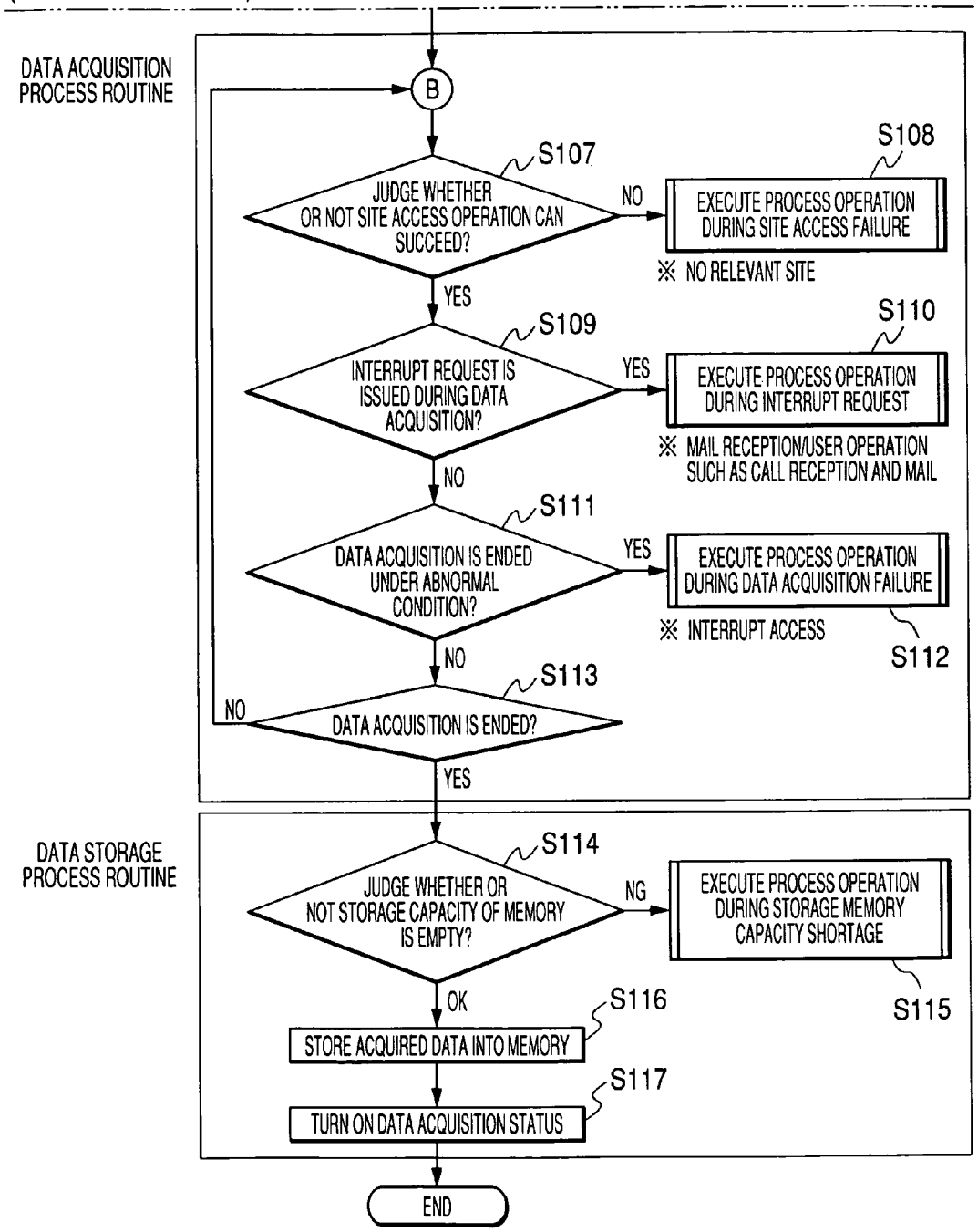

(FIG. 4 CONTINUED)
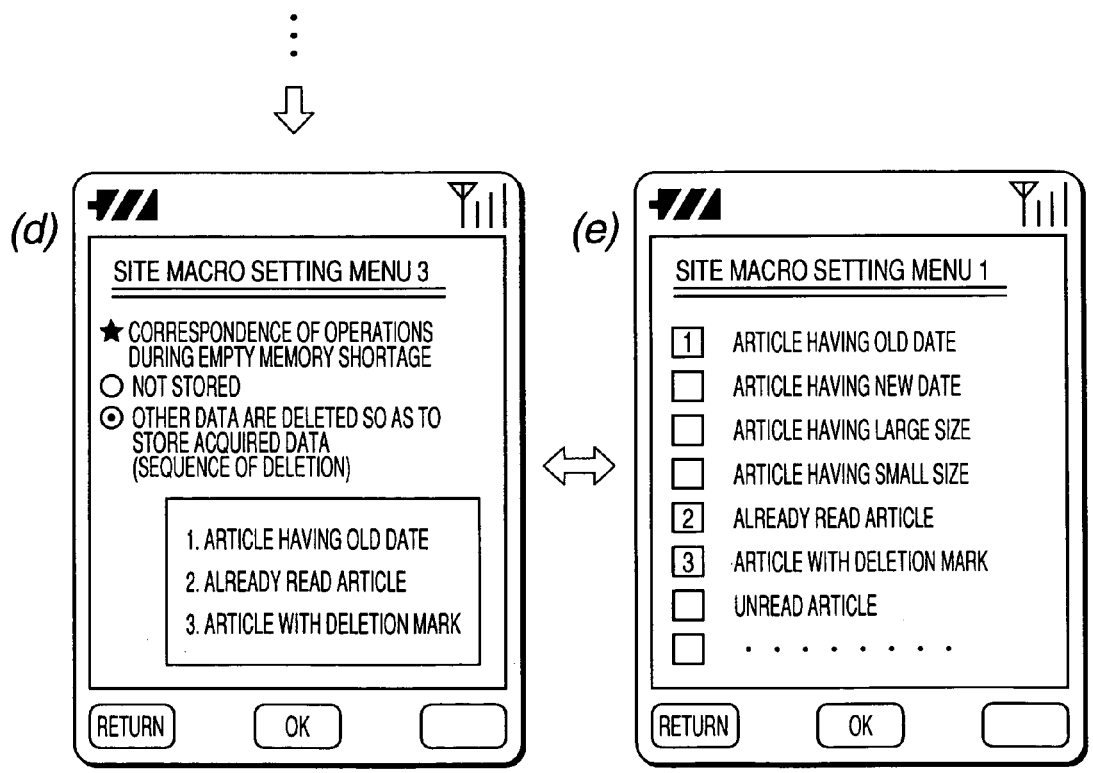

(a)

(b)

(a)

(b)

(a)

(b)

(a)

(b)

MOBILE TERMINAL APPARATUS

TECHNICAL FIELD

The present invention relates to a portable terminal apparatus for cyclically accessing Web sites, and the like on the Internet to acquire information therefrom.

BACKGROUND ART

In terminal apparatus with employment of personal computers and the like, while these terminal apparatus are connected via mainly wired communication lines to networks such as the Internet, the terminal apparatus can acquire target information by viewing Web sites which may provide information on the networks, and/or by downloading data from servers which constitute Web sites. In such a case that information is acquired in such terminal apparatus, a so-called "automatic cyclically accessing method" has been proposed (refer to, for example, patent publication 1, patent publication 2, and patent publication 3). That is, in this automatic cyclically accessing method, while a site to be accessed has been previously designated, a terminal apparatus automatically accesses the designated site in a predetermined time period, or at a predetermined time instant so as to acquire the target information. This method has a merit in the case that terminal apparatus accesses the same site in a periodic manner so as to update information, and wants to continuously grasp the latest information.

On the other hand, very recently, Internet functions are mounted even on portable terminal apparatus for performing wireless communications such as portable telephone apparatus, so that various sorts of information can be acquired. For instance, in such a case that news information is acquired by a portable telephone apparatus, the below-mentioned sequence is carried out. That is, first of all, a connection of the Internet is established, and thereafter, a desirable news site is selected by repeating a selection operation several times in accordance with a menu display, or by directly entering URLs (Uniform Resource Locators) of sites in the portable telephone apparatus. In the conventional portable terminal apparatus, cumbersome operations such as the above-explained selection operation are required every time the conventional portable terminal apparatus access to a target site in order to acquire necessary information from Web sites, or the like on the Internet.

(patent publication 1)
JP-A-11-213015 (pages 6 to 10, FIG. 1 to FIG. 4)
(patent publication 2)
JP-A-2001-346174 (pages 3 to 9, FIG. 7)
(patent publication 3)
JP-A-2001-14210 (pages 2 to 4, FIG. 1)

As previously explained, in the case that the conventional portable terminal apparatus accesses the Web sites and the like on the Internet so as to acquire the information, such a sequence is required in which the conventional portable terminal apparatus accesses the target site so as to select the pages which are wanted to be viewed every time the information is acquired. As a result, as to a news site and the like which are viewed everyday, every time the conventional portable terminal apparatus views the news site and the like, a similar process operation must be repeatedly carried out. Thus, the conventional portable terminal apparatus owns such a problem that the process operation becomes cumbersome. Also, since the dimension of the operation unit of the conventional portable terminal apparatus is small, there is another problem. That is, in such a case that accessing operations are frequently carried out, a user is forcibly required to perform the cumbersome operations.

Also, in the conventional portable terminal apparatus, information such as news cannot be automatically distributed, or cannot be automatically acquired. Furthermore, since the conventional portable terminal apparatus owns a further problem as to storage capacities thereof, the acquired information may be once viewed, but after a plurality of the acquired information have been stored, the stored information cannot be viewed within one time. Also, since the users carry the portable terminal apparatus during walks, the following problem may occur. That is, for example, in the case that the users are moved to places where electromagnetic waves cannot be reached (namely, outside service area where electromagnetic waves can be reached), the portable terminal apparatus cannot access the target sites.

Under such a circumstance, although the automatic cyclically accessing function is desired to be mounted on portable terminal apparatus, the portable terminal apparatus own specific reasons, for example, use environments of the portable terminal apparatus may be changed in connection with transport of the portable terminal apparatus, and there are many limitations in hardware specifications thereof. As a consequence, as explained in the background art, if the conventional portable terminal apparatus merely and automatically cyclic-access a preselected site at a preset time instant, then the conventional portable terminal apparatus cannot be satisfactorily operated in view of a practical use.

The present invention has been made to solve these problems, and therefore, has an object to provide such a portable terminal apparatus. That is, since a process sequence related to an access to a site on a network is previously and arbitrarily set by a user, the portable terminal apparatus can automatically perform sequential process operations capable of recovering/processing system operations in the case that a failure specific to the portable terminal apparatus happens to occur, for instance, when the portable terminal apparatus is located outside a service area where electromagnetic waves can be reached, and when a storage capacity thereof becomes short. Even in the portable terminal apparatus for performing wireless communications, information can be acquired at a predetermined time instant by way of an automatic cyclically accessing operation, and desirable information can be readily obtained when it is required.

DISCLOSURE OF THE INVENTION

A portable terminal apparatus, according to the present invention, is featured by such a portable terminal apparatus comprising: a network access unit for accessing a site on a network so as to acquire data; a data storage unit for storing thereinto the acquired data; an accessing process sequence setting unit capable of arbitrarily setting an access setting condition which contains an access destination, a time instant, and processing sequence, which are related to the access operation to the site on the network in response to n instruction of a user; an accessing process sequence storage unit for storing thereinto a series of processing sequences based upon the set access setting condition; and an accessing process executing unit for executing a predetermined processing sequence in accordance with the access setting condition when the present time is reached to a preset time instant so as to perform an accessing process operation with respect to the set site.

With employment of the above-described arrangement, based upon the access setting condition which has been arbitrarily set by the user, a series of the process sequences responding to the access setting condition are executed at a predetermined time instant in response to a macro instruction of a macro-formatted program, and thus, the portable terminal apparatus automatically accesses the site on the network so as to acquire the data. At this time, since the process sequences capable of recovering/processing system operations in the case that the failure specific to the portable terminal apparatus happens to occur, for instance, when the portable terminal apparatus is located outside the service area where the electromagnetic waves can be reached, and when the storage capacity becomes short, are contained in the access setting process sequences, the information can be acquired even in the portable terminal apparatus for performing the wireless communication by executing the automatic cyclically accessing operation every predetermined time instant, and the user can easily acquire the desirable information when the user requires this information.

Also, the accessing process sequence setting unit sets a processing sequence in at least one of an access starting process sequence for starting an access operation to the set site at the preset time instant; a data acquiring process sequence for acquiring data from the accessed site; and a data storing process sequence for storing the acquired data into the data storage unit.

With employment of the above-described arrangement, the process sequences capable of recovering/processing system operations in the case that the failure specific to the portable terminal apparatus happens to occur, for instance, when the portable terminal apparatus is located outside the service area where the electromagnetic waves can be reached, and when the storage capacity becomes short, can be set to process sequences as to when an access operation is commenced, when data is acquired, and when data is acquired. As a result, in the case that the portable terminal apparatus accesses a preset site and acquires data from this preset site in the automatic cyclically accessing operation, even when a failure happens to occur, the portable terminal apparatus can properly execute such a process operation in accordance with the condition set by the user.

Also, the accessing process sequence setting unit sets a process sequence during out of service area in the case that the own apparatus is located outside the service area where communications can be performed when an access operation to the set site is commenced in the access starting process sequence.

With employment of the above-described arrangement, based upon the process sequences set by the user, when the access operation is commenced, the process operation for such a case that the portable terminal apparatus is located outside the service area where the communication can be carried out is automatically performed. As a consequence, in the case that the previously set site is automatically accessed so as to acquire the data, the portable terminal apparatus can properly execute such a process operation responding to the setting condition by the user even when the portable terminal apparatus is located outside the service area.

Also, the accessing process sequence setting unit sets a process sequence during another task initiation in the case that since the own apparatus executes another task, the own apparatus is under use when an access operation to the set site is commenced in the access starting process sequence.

With employment of the above-described arrangement, based upon the process sequences set by the user, when the access operation is commenced, the process operation for such a case that the portable terminal apparatus executes a task related to other use, for example, under data communication operation, and thus, is under operation is automatically carried out. As a consequence, in the case that the previously set site is automatically accessed so as to acquire the data, the portable terminal apparatus can properly execute such a process operation responding to the setting condition by the user even when the portable terminal apparatus initiate another task.

Also, the accessing process sequence setting unit sets a process sequence during site access failure in the case that when the set site is accessed in the data acquiring process sequence, the accessing operation fails.

With employment of the above-described arrangement, based upon the process sequences set by the user, the process operation for such a case that the portable terminal apparatus fails in an access operation by obtaining no answer sent from an access destination is automatically carried out, for example, when the portable terminal apparatus accesses the set site, an access refusal is received, or the relevant site is not present. As a consequence, in the case that the previously set site is automatically accessed so as to acquire the data, the portable terminal apparatus can properly execute such a process operation responding to the setting condition by the user even when the portable terminal apparatus fails in the site access operation.

Also, the accessing process sequence setting unit sets a process sequence during interruption in the case that when data is acquired from the set site in the data acquiring process sequence, the own apparatus accepts an interrupt request.

With employment of the above-described arrangement, based upon the process sequences set by the user, the process operation for such a case that the portable terminal apparatus receives an interrupt request as another use, for example, a call reception, a mail reception, and a user operation when the portable terminal apparatus acquires the data from the set site is automatically carried out. As a consequence, in the case that the previously set site is automatically accessed so as to acquire the data, the portable terminal apparatus can properly execute such a process operation responding to the setting condition by the user even when the interrupt request is issued.

Also, the accessing process sequence setting unit sets a process sequence during data acquisition failure in the case that when data is acquired from the set site in the data acquiring process sequence, the own apparatus fails to acquire the data.

With employment of the above-described arrangement, based upon the process sequences set by the user, the process operation for such a case that the portable terminal apparatus fails in the data acquisition, for example, when the portable terminal apparatus is located outside the service area where the communication can be performed, while the portable terminal apparatus acquires the data from the set site, is automatically carried out. As a consequence, in the case that the previously set site is automatically accessed so as to acquire the data, the portable terminal apparatus can properly execute such a process operation responding to the setting condition by the user even when the portable terminal apparatus fails in the data acquisition.

Also, the accessing process sequence setting unit sets a process sequence during storage memory shortage in the case that when the acquired data is stored in the data storing process sequence, a storage capacity of the data storage unit becomes short.

With employment of the above-described arrangement, based upon the process sequences set by the user, the process operation for deleting data is automatically carried out in such a case that while the portable terminal apparatus stores the acquired data, since the storage capacity of the data storage unit becomes short, the acquired data cannot be directly stored thereinto. As a consequence, in the case that the previously set site is automatically accessed so as to acquire the data, the portable terminal apparatus can properly execute such a process operation responding to the setting condition by the user even when the storage capacity of the storage memory becomes short.

Also, the portable terminal apparatus is comprised of: a retrieving unit for retrieving the acquired data stored in the data storage unit. With employment of this arrangement, as to the data acquired from the set site, desirable acquired data may be easily viewed, for instance, the desirable data may be extracted from the plural data, or a plurality of the desirable data may be combined with each other to form a list so as to confirm the desirable data.

Also, the accessing process sequence setting unit is capable of setting a transfer destination to which the acquired data is transferred; and the portable terminal apparatus further includes a data transferring unit for transferring the acquired data to the set transfer destination. With employment of this arrangement, the data acquired from the set site is transferred to a predetermined transfer destination, and the transferred data may be confirmed at an arbitrary place, and by a terminal.

Figure 1:
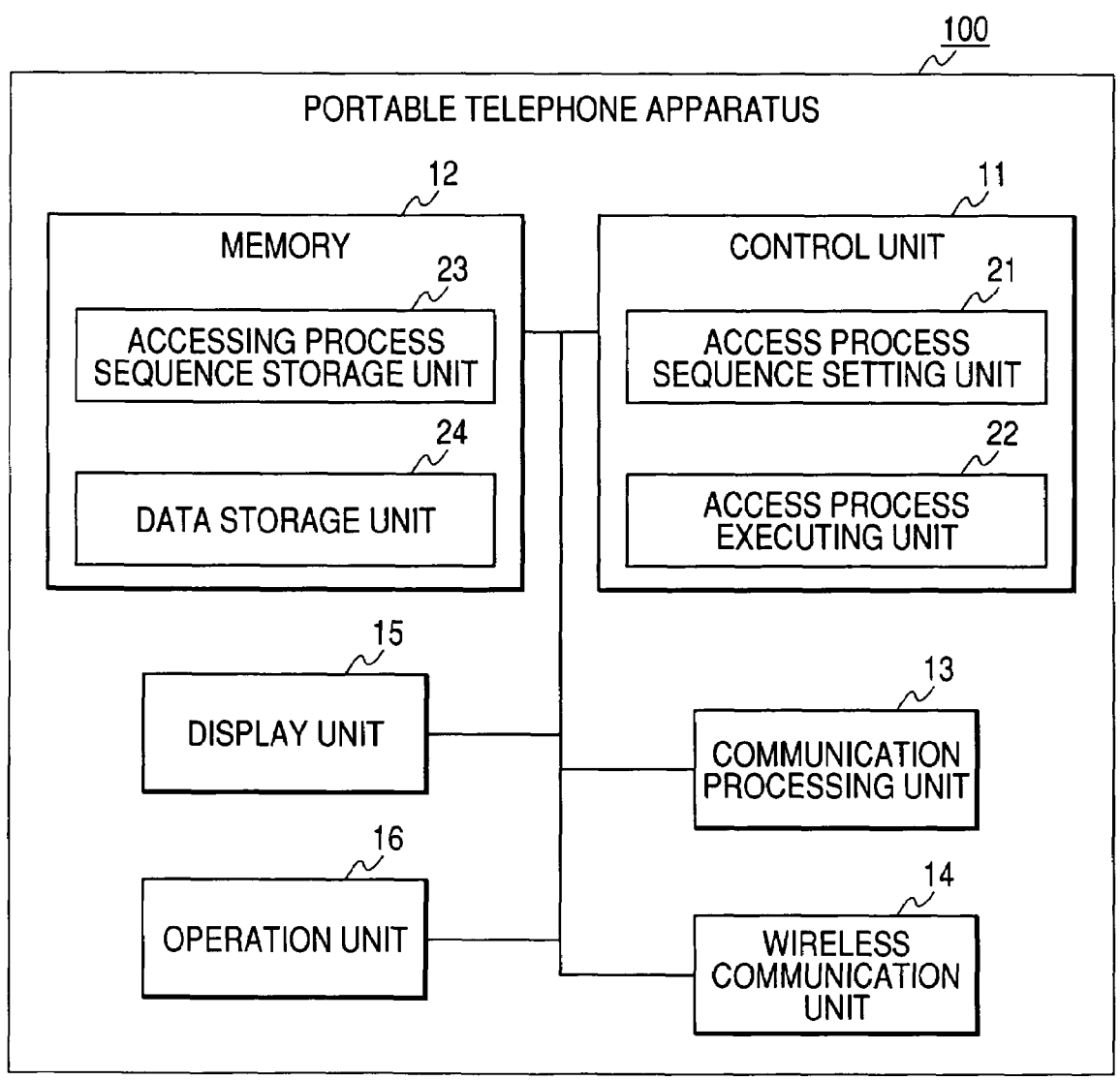
FIG. 1 is a block diagram for indicating an internal functional arrangement of a portable telephone apparatus according to an embodiment of the present invention.

It should be noted that in the drawings, reference numeral 11 shows a control unit; reference numeral 12 indicates a memory; reference numeral 13 representing a communication processing unit; reference numeral 14 shows a wireless communication unit; reference numeral 15 denotes a display unit; reference numeral 16 represents an operation unit; reference numeral 21 indicates an access process sequence setting unit; reference numeral 23 shows an access process sequence storage unit; reference numeral 24 indicates a data storage unit; reference numeral 100 represents a portable telephone apparatus; reference numeral 200 indicates a base station, reference numeral 300 denotes a network; and reference numeral 400 represents a server.

BEST MODE FOR CARRYING OUT THE INVENTION

Referring now to drawings, an embodiment of the present invention will be described.

Figure 2:
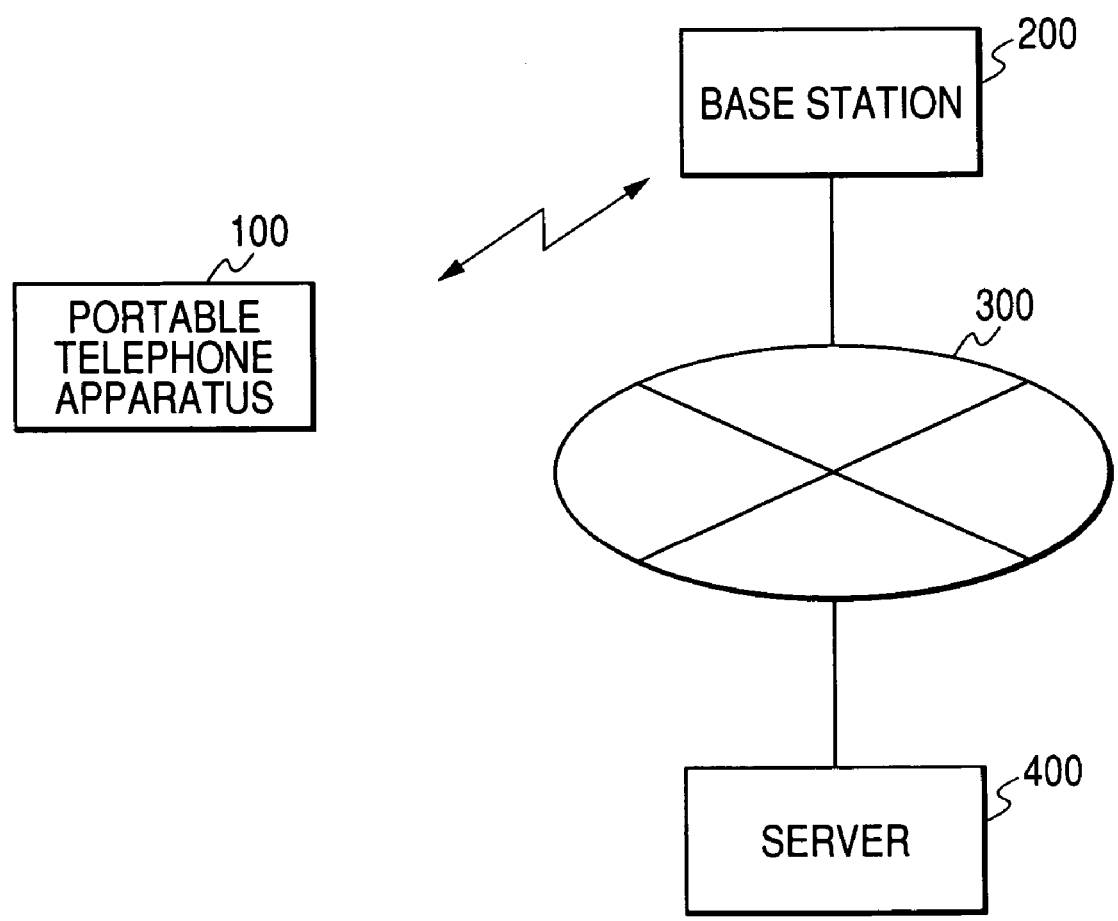
FIG. 2 is a schematic diagram for representing a system arrangement in which an automatic cyclically accessing system of the Internet is realized by employing the portable telephone apparatus according to the present embodiment.

In the present embodiment, such a case is exemplified. That is, while a portable telephone apparatus is employed as an example of a portable terminal apparatus, the portable telephone apparatus is connected to a network such as the internet, and accesses a site such as a Web on the network so as to acquire information therefrom. FIG. 1 is a block diagram for indicating an internal functional arrangement of a portable telephone apparatus according to an embodiment of the present invention, FIG. 2 is a schematic diagram for representing a system arrangement in the case that an automatic cyclically accessing system of the Internet is realized by employing the portable telephone apparatus according to the present embodiment.

As shown in FIG. 1, the portable telephone apparatus according to the present embodiment is arranged by mainly including a control unit 11, a memory 12, a communication processing unit 13, a wireless communication unit 14, a display unit 15, and an operation unit 16.

The control unit 11 corresponds to a block which controls an entire operation of the portable telephone apparatus. The control unit 11 contains an access process sequence setting unit 21 (will be explained later) and an access process executing unit 22 (will be discussed later). The access process sequence setting unit 21 corresponds to an access process sequence setting unit recited in claims. The access process executing unit 22 corresponds to an access process executing unit recited in the claims. This control unit 11 includes a CPU for executing various sorts of calculations, a RAM functioning as a work memory, a ROM which has stored thereinto a program of control operations, and the like (any of these structural components are not shown). The access process sequence setting unit 21 and the access process executing unit 22 are stored in the ROM in the form of a program which is executed by the control unit 11.

While the memory 12 contains an access process sequence storage unit 23 for storing thereinto an access process sequence which is arbitrarily set by a user, and a data storage unit 24 for storing thereinto such data which has been acquired by accessing a site on the network, this memory 12 is used to store thereinto various sorts of data. The access process sequence storage unit 23 corresponds to an access process sequence storage unit recited in the claims. The data storage unit 24 corresponds to a data storage unit recite in the claims.

The communication processing unit 13 corresponds to such a block which performs process operations related to communications such as telephone functions, data communication functions, and the like. In the telephone functions, a telephone calling operation, a telephone call receiving operation, a telephone voice communication processing operation are carried out. In the data communication functions, an access operation to a server on the network, and a communication data processing operation are carried out. Also, the wireless communication unit 14 corresponds to such a block that a communication signal is transmitted/received by way of a wireless communication manner. A network access unit recited in the claims is constituted by a network access function made by the communication processing unit 13, the wireless communication unit 14, and the control unit 11.

Also, both the display unit 15 and the operation unit 16 are provided as a user interface which is used to input and output data. The display unit 15 is arranged by a liquid crystal display device, and the like. This display unit 15 displays thereon various sorts of information such as operation conditions of the apparatus. The operation unit 16 is constituted by a plurality of operation keys, and the like, and enters data and instructions by being operated by the user.

As shown in FIG. 2, a portable telephone apparatus 100 is connected via a wireless interface to a base station 200. The base station 200 is connected via a communication line to a network 300 such as the Internet. As the communication line, either a mobile communication network or a public communication network (PSTN, ISDN etc.) is provided. While a server 400 which constitutes sites such as Web sites for distributing various sorts of information is provided on the network 300, the server 400 is mutually connected to the portable telephone apparatus 100 and the base station 200. The portable telephone apparatus 100 may access the server 400 on the network 300 and may download data provided from the server 400 in accordance with a predetermined procedure.

Next, a description is made of operations as to the portable telephone apparatus according to this embodiment. When the user issues an operation instruction in accordance with a menu and executes a predetermined access setting operation so as to set a process sequential operation related to an access to a specific site, the portable telephone apparatus 100 of the present embodiment stores a series of process sequential operations based upon this access setting operation as a macro-formatted program into the access process sequence storage unit 23. Then, the portable telephone apparatus 100 can execute process sequential operations in accordance with the above-explained access setting operation in response to a macro instruction made based upon the macro-formatted program which has been stored, and thus, can automatically cyclic-access a specific site for a predetermined time period, so that data of the specific site can be acquired and stored.

Figure 3:
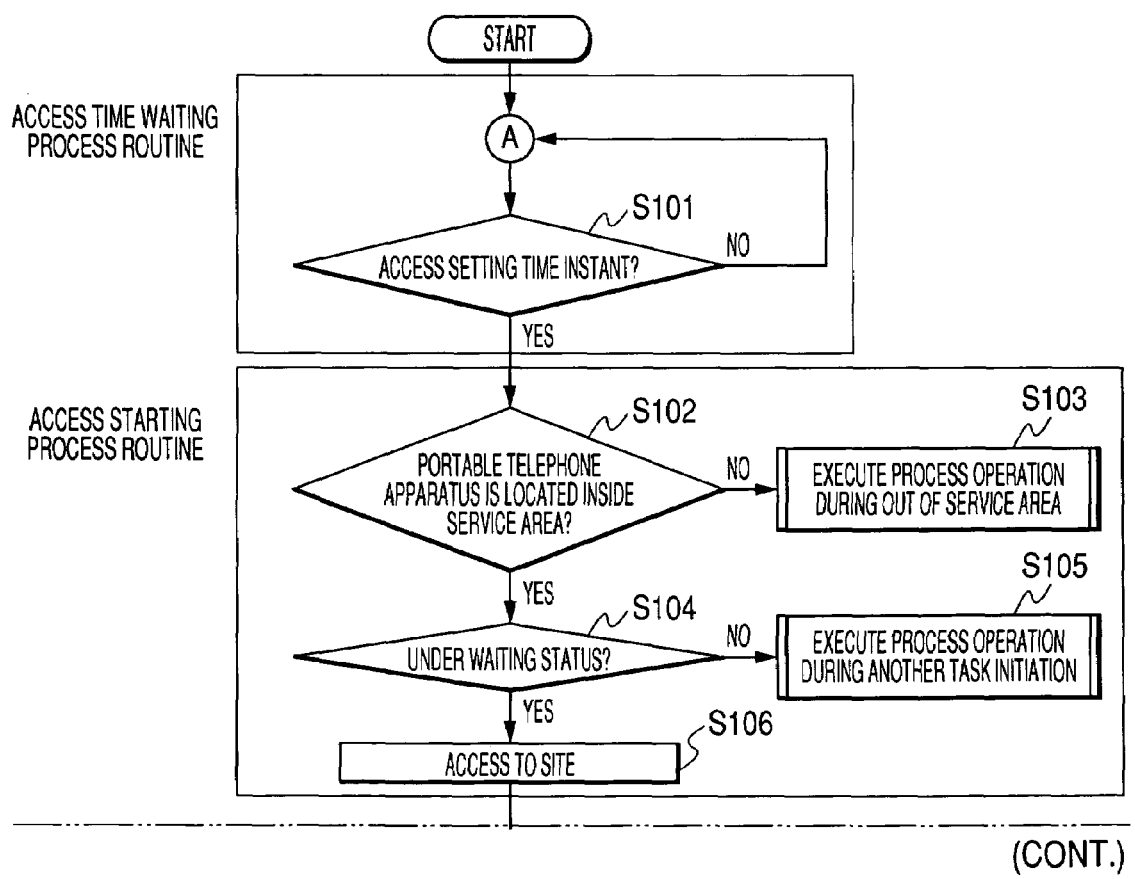
FIG. 3 is a flow chart for describing flow operations as to an automatic site cyclically accessing operation of the portable telephone apparatus according to the present embodiment.

Firstly, an automatic cyclically accessing operation according to the present embodiment is now explained, and concrete access setting operations for the automatic cyclically accessing operation will be explained later. FIG. 3 is a flow chart for describing flow operations as to automatic site cyclically accessing operations executed by the portable telephone apparatus according to the present embodiment.

(1) Access Time Instant Waiting Process Routine

While the portable telephone apparatus 100 grasps a time instant by a clock (not shown) within the control unit 11, the portable telephone apparatus 100 judges whether or not the present time is approached to an access setting time instant which has been set by a user under control of the control unit 11 (step S101).

(2) Access Starting Process Routine

When the present time is reached to the access setting time instant which has been set by the user in the step S101, the portable telephone apparatus 100 confirms whether or not the own apparatus 100 can perform a communication operation (namely, own apparatus 100 is present in service area where electromagnetic waves can be reached) in a step S102. In the case that the own apparatus 100 is located outside the service area where the electromagnetic waves can be reached, the portable telephone apparatus 100 executes a process operation during out of service area (will be explained later) in a step S103. On the other hand, in the case that the own apparatus 100 can perform the communication operation, the portable telephone apparatus 100 confirms that the own apparatus 100 is brought into such a condition that the own apparatus 100 can access a specifically-set site which has been set by the user in a step S104.

In such a case that while another task is initiated, the own apparatus 100 cannot access the set site, the portable telephone apparatus 100 executes a process operation during another task initiation (will be discussed later) in a step S105. The expression "while another task is initiated" implies, for example, "while the own apparatus 100 is under telephone communication", "while the won apparatus 100 accesses another site of the Internet", and the like. When the portable telephone apparatus 100 is under such a condition that the own apparatus 100 can access the set site in the step S104, the control unit 11 executes an access operation to the specifically-set site by the communication processing unit 13 and the wireless communication unit 14 in a step S106.

(3) Data Acquiring Process Routine

Next, the portable telephone apparatus 100 judges whether or not the own apparatus 100 can succeed in an access to the relevant site (step S107). When the portable telephone apparatus 100 fails in the access to the relevant site, the own apparatus 100 executes a process operation during site access failure will be explained later (step 108). As the above-described site access failure, the following cases are conceivable, namely, in the case that a site set by the user is not present, a server of an accessed site cannot respond due to load concentration, or malfunction, and the like. When the portable telephone apparatus 100 can succeed in the access operation in the step S107, the own apparatus 100 commences to acquire data, and judges whether or not an interrupt request is issued during data acquiring operation (step S109). It should be understood that the acquired data is temporarily stored in the RAM functioning as the work memory employed in the control unit 11.

In the case that such an interrupt request as a telephone call to the own apparatus 100 is issued during the data acquisition operation, the portable telephone apparatus 100 executes a process operation during interruption operation (will be explained later) in a step S110. In the case that no interrupt request is issued in the step S109, the portable telephone apparatus 100 judges whether or not the data acquisition operation has not been accomplished under abnormal condition (step S111). In such a case that an abnormal event happens to occur (namely, line is cut off during data acquisition operation), and thus, the data acquisition operation is ended under abnormal condition, the portable telephone apparatus 100 executes a process operation during data acquisition failure (will be explained later) in a step S112. On the other hand, in the case that the data acquisition operation has not been accomplished under abnormal condition in the step S111, the portable telephone apparatus 100 judges whether or not the data acquisition operation is accomplished (step S113). In the case that the data acquisition operation has not yet been accomplished, the process operation is returned to a point which is indicated by symbol "B" within the flow chart, and thus, the sequential operations defined from the step S107 are repeatedly carried out.

(4) Data Storing Process Routine

When the judgement is made that the data acquisition operation is accomplished in the step S113, the portable telephone apparatus 100 confirms an empty storage capacity of the data storage unit 24 in the memory 12, and judges whether or not a size of the acquired data can be stored in the data storage unit 24 (step S114). In such a case that the size of the acquired data is large, so that this acquired data cannot be stored within the empty storage capacity of the data storage unit 24, the portable telephone apparatus 100 executes a process operation during storage memory storage (will be explained later) in a step S115. In the case that the empty storage capacity is larger than the acquired data, the portable telephone apparatus 100 stores the acquired data into the data storage unit 24 (step S116). Finally, the portable telephone apparatus 100 turns ON a data acquisition status, which indicates a completion of executing the data acquisition (step S117), and then, accomplishes the series of the automatic cyclically accessing process operation.

Although the data has been once acquired and then the empty storage capacity of the data storage unit 24 in the memory 12 has been confirmed in the above-described sequential operations, the below-mentioned modification may be conceived. For instance, a size of data may be alternatively confirmed by way of such a method that information as to only the size thereof is transmitted before this data is acquired, or the information as to the size thereof is combined in front of the data and then the data combined with the size information is transmitted. At this stage, the portable telephone apparatus 100 may alternatively confirm an empty storage capacity of the data storage unit 24 under control of the control unit 11. Then, if the required empty storage capacity is available, then the portable telephone apparatus 100 may alternatively acquire the data. In the case that the necessary empty storage capacity is not present, the portable telephone apparatus 100 may alternatively execute a process operation during storage memory shortage (will be discussed later) so as to delete old data, and the like, so that an empty storage capacity may be increased, and thereafter, the data may be acquired. Since such a modification is executed, the acquired data may be directly stored in the data storage unit 24 without requiring a memory area which is used to once store thereinto the data.

It should also be understood that the above-explained automatic cyclically accessing operation is executed with respect to each of the sites which have been set by the user. Also, in the flow operations of the automatic cyclically accessing operations shown in the flow chart of FIG. 3, the respective process sequential operations are executed based upon the operations of the access process executing unit 22 of the control unit 11.

In the above-described sequential operations, the respective process blocks as to the process operation during out of service area (step S103), the process operation during another task initiation (step S105), the process operation during site access failure (step S108), the process operation during interruption operation (step S110), the process operation during data acquisition failure (step S112), and the process operation during storage memory storage (step S115), correspond to such blocks that the user of the portable telephone apparatus 100 can previously and arbitrarily set process sequences as access setting operations. The setting operation for this access setting operation can be carried out based upon the operations of the access process sequence setting unit 21 in accordance with a menu displayed on the display unit 15 of the portable telephone apparatus 100. A content of an access setting operation is stored into the access process sequence storage unit 23 as a program formed in a macro form (namely, macro-formatted program). The automatic cyclically accessing process operation is executed by the access process executing unit 22 in accordance with a macro instruction which is produced based upon this macro-formatted program. Each of the process sequences may be carried out every arbitrary access subject, for example, every site, and every group of plural sites. Apparently, the content of the setting operation may be changed.

Next, as to each of the process blocks which may be arbitrarily set by the user of the portable telephone apparatus 100, a concrete setting method of process sequences and process flow operations thereof will now be described in detail.

Figure 4:
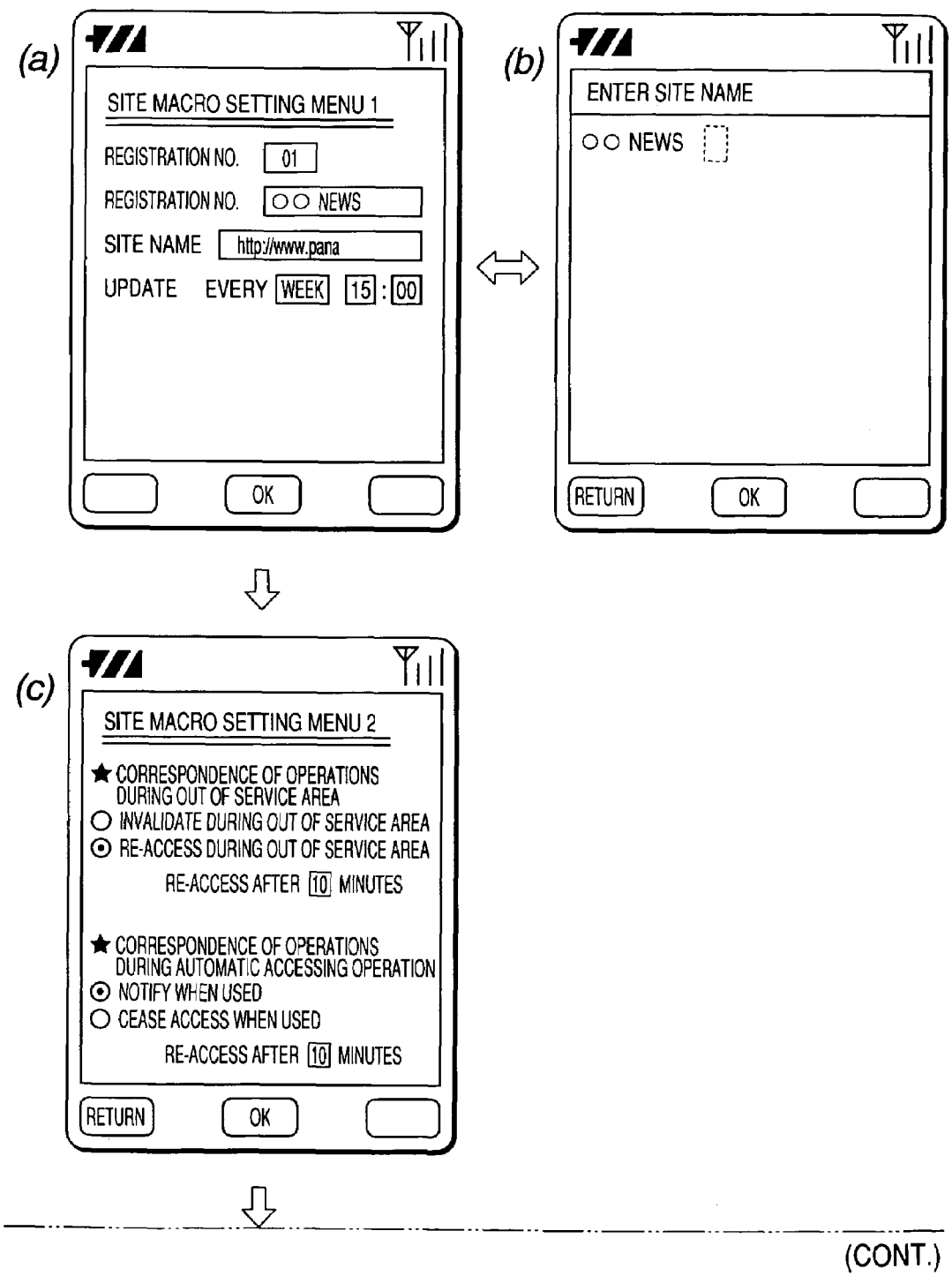
FIG. 4 is a schematic diagram for showing a portion of display examples as to automatic cyclic-access setting screens displayed on a display unit of the portable telephone apparatus according to the present embodiment.

FIG. 4 is a schematic diagram for indicating a portion of a display example as to an automatic cyclic-access setting screen displayed on the display unit 15 of the portable telephone apparatus 100. When an item of an automatic cyclic-access setting operation is selected from a menu screen, a registration screen of a site macro setting menu 1 as represented in FIG. 4(a) is displayed.

In the beginning, a site name and a URL of an access destination which is automatically and cyclically accessed are entered; a selection is made of an access period, for example, "every week", "every day", and "every hour" as an access setting time instant when an automatic cyclically accessing operation is carried; and a time instant corresponding to the selected access period is also entered. As a result, the time instant (period) when the designated site is accessed is determined. It should also be noted that when the site name and the URL are entered, these site name and URL may be alternatively copied by using a bookmark function of the portable telephone apparatus 100, or may be directly entered on a character input screen as indicated in FIG. 4(*b*).

After the input operation is accomplished on the registration screen of FIG. 4(*a*), when an OK button under the registration screen is pushed, a registration screen of a site macro setting menu 2 as indicated in FIG. 4(*c*) is displayed. With employment of this display screen, both the sequences as to the process operation during out of service area and the sequences as to the process operation during another task initiation can be set.

When the sequences as to the process operation during out of service area are set, as indicated in FIG. 4(*c*), the user selects that the site access operation is invalidated when the own apparatus 100 is located outside the service area where the electromagnetic waves can be reached, or selects that the re-accessing operation is performed after a predetermined time has elapsed. When the re-accessing operation is carried out, a time for this re-accessing operation is also inputted. Since this item selection is made, sequences as to process operations during out of service area as represented in a flow chart of FIG. 5 are set.

Figure 5:
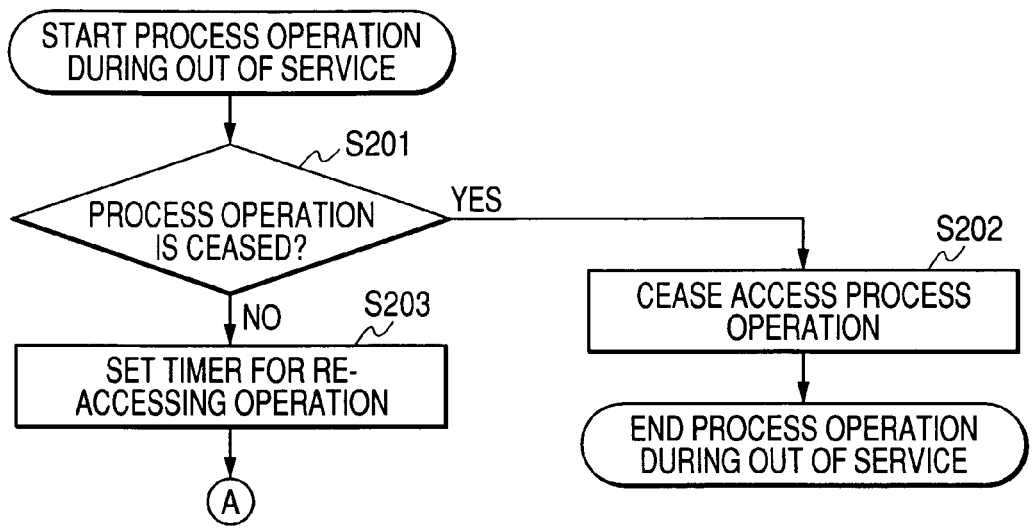
FIG. 5 is a flow chart for describing process flow operations during out of service area which may be arbitrarily set by a user in an automatic cyclic-access processing operation of the portable telephone apparatus according to the present embodiment.

In this case, a description is made of the process operations during out of service area with reference to FIG. 5. When the own apparatus 100 is located outside the service area where the electromagnetic waves can be reached and the process operation thereof is entered to this process block during out of service area, the portable telephone apparatus 100 firstly judges whether or not the access process operation under execution is ceased to be invalidated (step S201). In such a case that it has been so set that the access process operation is invalidated during out of service area, the portable telephone apparatus 100 ceases the access process operation (step S202), and accomplishes the process operation during out of service. On the other hand, in the case that it has been so set that the re-access operation is carried out, the portable telephone apparatus 100 turns ON a timer setting operation of the re-accessing operation for the set time duration so as to start a timer counting operation (step S203), and the process operation thereof is returned to the point indicated by symbol "A" in the flow chart of FIG. 3. Then, the portable telephone apparatus 100 repeatedly executes the process sequences from the step for judging whether or not the present time is reached to the access setting time instant.

Figure 6:
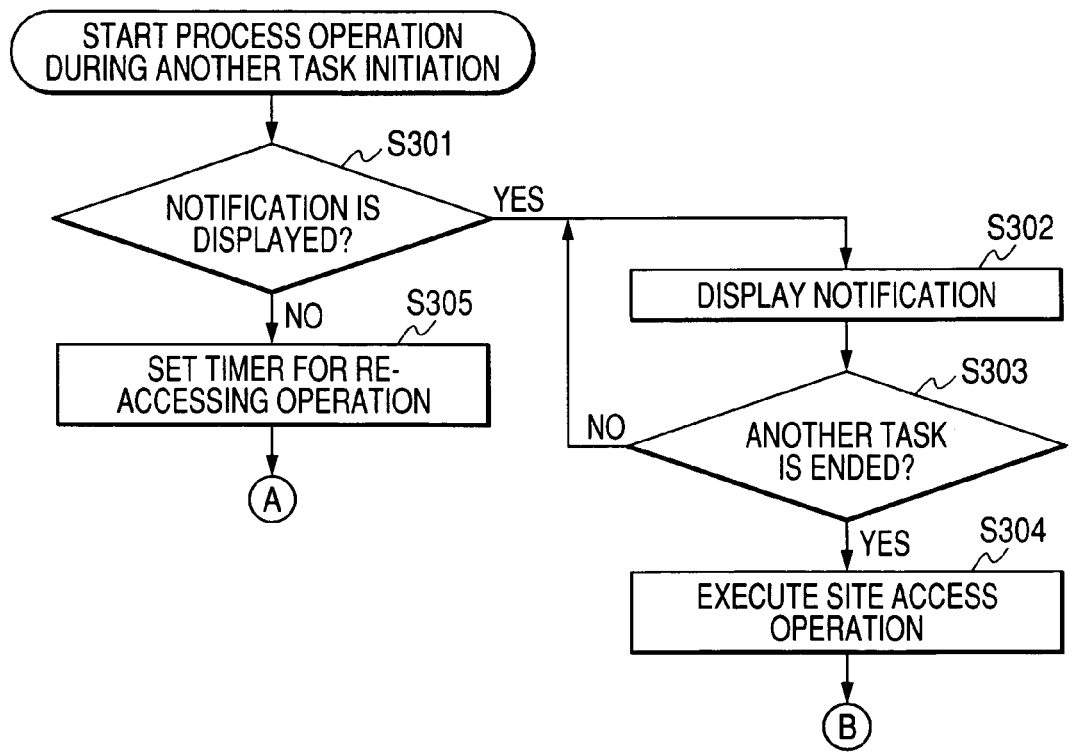
FIG. 6 is a flow chart for describing process flow operations when another task is initiated which may be automatically set by the user in the automatic cyclic-access processing operation of the portable telephone apparatus according to the present embodiment.

Also, in the setting operation for the process operations during another task initiation, as indicated in FIG. 4(*c*), in the case that the own apparatus 100 is under operation due to another use, for example, the own apparatus 100 is operated in a telephone communication, or is under access operation to other Internet sites, a selection is made as follows: That is, such a fact that the present time is reached to the site access starting time instant of the automatic cyclically accessing operation is notified to the user. Otherwise, when the portable telephone apparatus 100 is under use, the access operation is ceased, and after the predetermined time has elapsed, the re-accessing operation is carried out. In the case that the re-accessing operation is carried out, the time duration for this re-accessing operation is also entered. Since this item selection is carried out, sequences in process operations during another task initiation as shown in a flow chart of FIG. 6 are set.

Now, the process operation during another task initiation will be described with reference to FIG. 6. While the own apparatus 100 is under operation due to another use at the access starting time instant, when the process operation is entered to this process operation block during another task initiation, the portable telephone apparatus 100 judges whether or not a notification is firstly issued to the user (step S301). If it has been so set that the notification is made, then the below-mentioned notification is displayed (step S302), and the portable telephone apparatus 100 judges whether or not the task under initiation is accomplished based upon the notification (step S303). In this notification, although the present time is reached to the access starting time instant of the automatic cyclically accessing operation, the portable telephone apparatus 100 is presently under use due to another task. When the display of this notification is repeatedly carried out until the task under initiation is accomplished, and the task is ended in the step S303, and then, a site accessing operation is brought into an available condition, the portable telephone apparatus 100 accesses the designated site (step S304). Then, the process operation is advanced to the point indicated by symbol "B" in the flow chart of FIG. 3. On the other hand, if it has been so set that the notification is not made in the step S301 (namely, access operation is ceased when own apparatus 100 is operated), the portable telephone apparatus 100 turns ON the timer setting operation of the re-accessing operation for the set time duration so as to start a timer counting operation (step S305), and the process operation thereof is returned to the point indicated by symbol "A" in the flow chart of FIG. 3. Then, the portable telephone apparatus 100 repeatedly executes the sequences as to the process operations from the step for judging whether or to the present time is reached to the access setting time instant.

Figure 7:
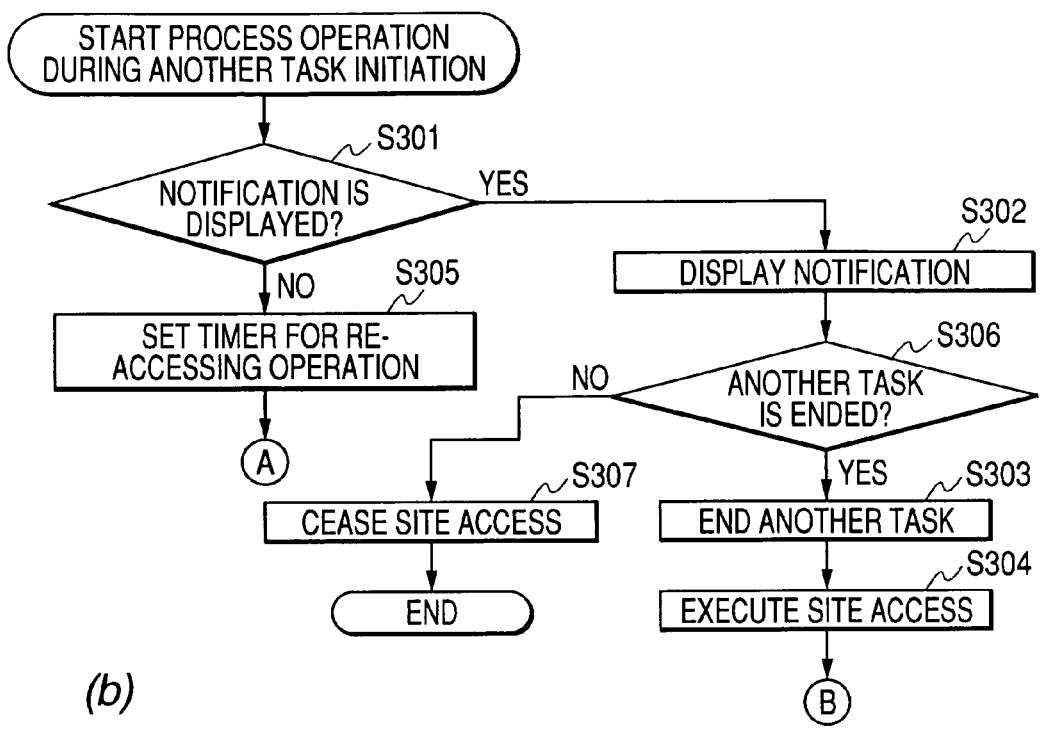
FIG. 7 is a flow chart for describing process flow operations of a modification when another task is initiated which may be automatically set by the user in the automatic cyclic-access processing operation of the portable telephone apparatus according to the present embodiment.
Figure 7:
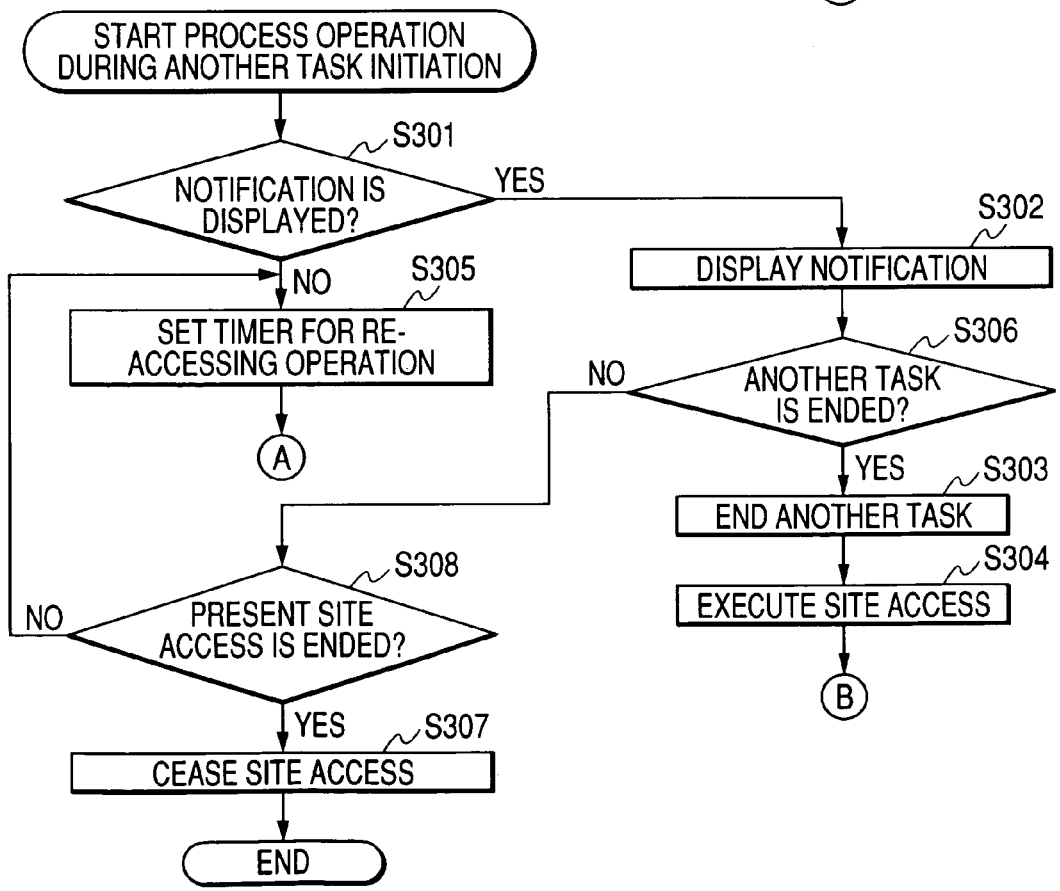

In the above-described sequences, the notification of "another task under initiation" is displayed until this task is ended, and then, when this task is ended, the site accessing operation is carried out. Alternatively, the below-mentioned modification may be conceived. FIG. 7 indicates sequential operations of modifications as to the process operation during another task initiation. In a first modification shown in FIG. 7(*a*), while the own apparatus 100 is under operation due to another use at the access starting time instant, when the process operation is entered to this process operation block during another task initiation, similar to FIG. 6, the portable telephone apparatus 100 judges whether or not a notification is firstly issued to the user (step S301). If it has been so set that the notification is made, then the below-mentioned notification is displayed (step S302). In this notification, although the present time is reached to the access starting time instant of the automatic cyclically accessing operation, the portable telephone apparatus 100 is presently under use due to another task. Then, at this stage, the portable telephone apparatus 100 displays a selection screen as to whether or not another task is accomplished (step 306). In such a case that the user views this selection screen, performs an operation for accomplishing another task, and enters another task ending instruction, the portable telephone apparatus 100 waits that another task is accomplished, or immediately accomplishes this task under initiation (step S303), and commences an access operation to the designated site (step S304). Then, the process operation is advanced to the point indicated by symbol "B" in the flow chart of FIG. 3. On the other hand, in the case that the user execute such an operation that another task is not accomplished, and enters an another task continuing instruction, the portable telephone apparatus 100 ceases the present site accessing operation (step S307), and waits for a subsequent site access operation.

In a second modification shown in FIG. 7(*b*), similar to FIG. 7(*a*), the portable telephone apparatus 100 displays a selection screen as to whether or not another task is accomplished in the step S306. At this time, in such a case that the user performs such an operation that another task is not ended and enters an another task continuing instruction, the portable telephone apparatus 100 displays a selection screen as to whether or not the present site accessing operation is accomplished (step S308). If the user views this selection screen, performs such an operation that the present site accessing operation is accomplished, and also, enters a site access ending instruction, then the portable telephone apparatus 100 ceases the present site accessing operation (step S307), and waits for a next site accessing operation. On the other hand, if the user performs such an operation that the present site accessing operation is not ended, and enters a site access continuing instruction, then the process operation is returned to the step S305. In this step S305, the portable telephone apparatus 100 turns ON the timer setting operation of the re-accessing operation so as to commence a time counting operation. As previously explained, the process operation during another task initiation may be alternatively arranged by executing the above-explained sequential operations of the first modification and the second modification.

After the user has made the selection on the registration screen of FIG. 4(*c*) and has completed the input operation, if the user pushes the OK button displayed under the screen, then a next process sequence setting screen is displayed. As previously explained, since the selection is made of the item displayed on the display unit 15, the process sequences in each of the process blocks can be arbitrarily set. Also, as to the process operation during site access failure, the process operation during interruption, the process operation during data acquisition failure, and the like, although setting operations may be carried out in a similar screen display, a subsequent screen display example is omitted.

Figure 8:
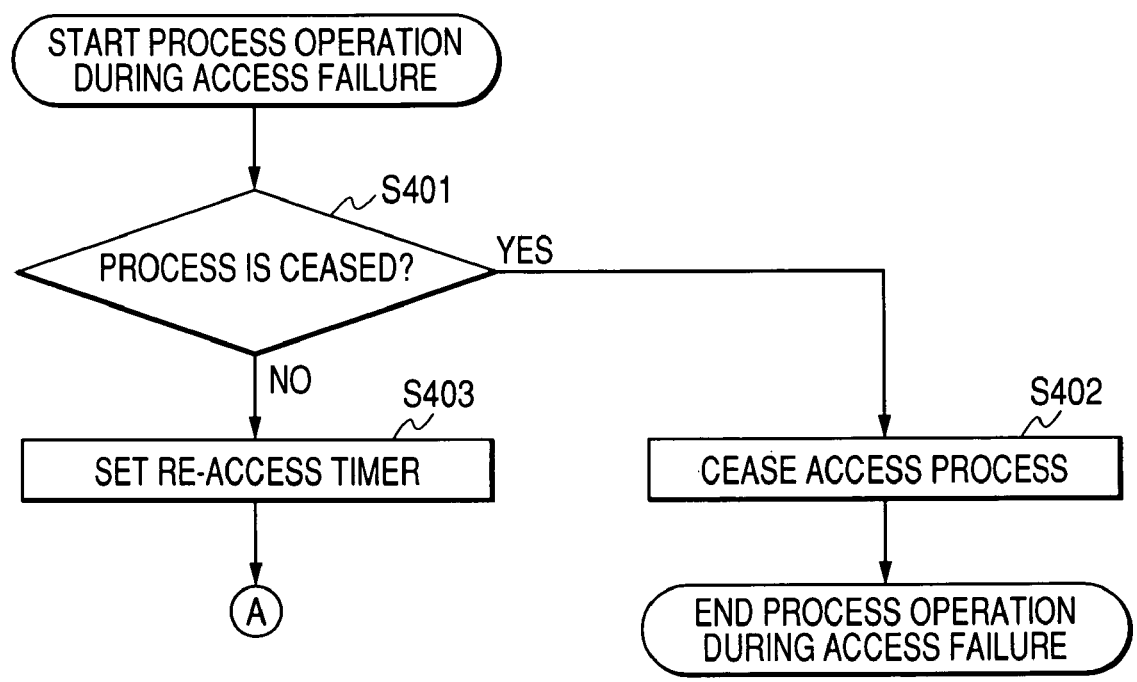
FIG. 8 is a flow chart for describing process flow operations when a site accessing operation fails which may be automatically set by the user in the automatic cyclic-access processing operation of the portable telephone apparatus according to the present embodiment.

FIG. 8 is a flow chart for representing flow operations as to the process operation during site access failure. Even when the portable telephone apparatus 100 tries to access a designated site at a preselected time instant, since the site is busy and/or this designated site is not present in the designated URL, if the process operation is entered to this process block, then the portable telephone apparatus 100 judge whether or not the portable telephone apparatus 100 firstly ceases the accessing process operation and invalidates this accessing process operation (step S401). In such a case that it has been so set that the accessing process operation is invalidated when the site access operation fails, the portable telephone apparatus 100 ceases the accessing process operation (step S402), and accomplishes the process operation during site access failure. On the other hand, in such a case that it has been so set that the re-accessing operation is carried out, the portable telephone apparatus 100 turns ON a timer setting operation of the re-accessing operation by the set time duration so as to commence a time counting operation (step S403), and then, the process operation is returned to the point indicated by symbol "A" in the flow chart of FIG. 3, and thus, the process sequences are repeated from the step for judging whether or not the present time is reached to the access setting time instant.

Figure 9:
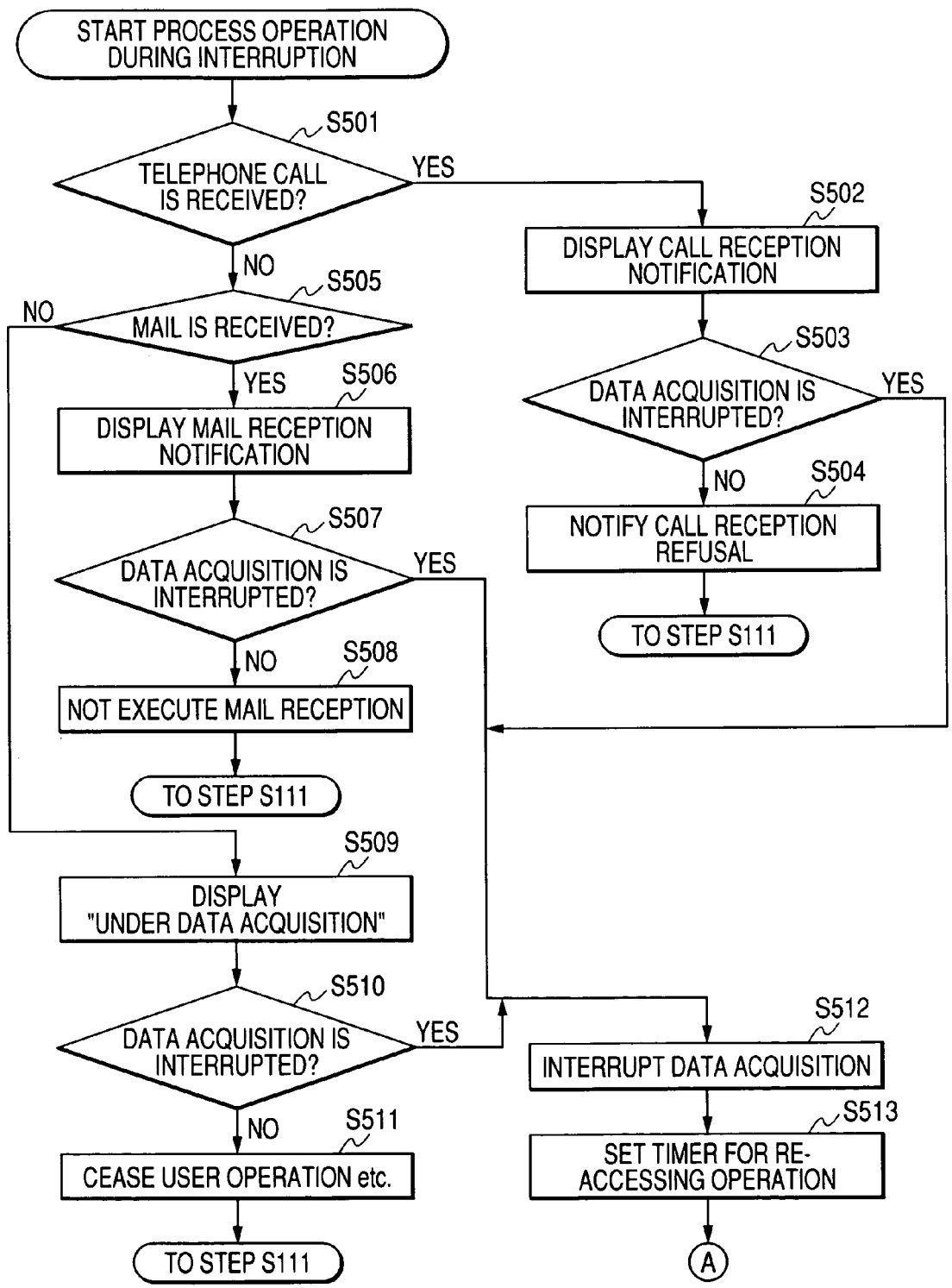
FIG. 9 is a flow chart for describing process flow operations when an interrupt operation is executed which may be automatically set by the user in the automatic cyclic-access processing operation of the portable telephone apparatus according to the present embodiment.

FIG. 9 is a flow chart for indicating flow operations as to the process operation during interruption. If an interrupt request is issued when a site is accessed and the process operation is entered to this process block, then the portable telephone apparatus 100 firstly judges whether or not this issued interrupt request corresponds to a call reception (step S501). In the case that this interrupt request is the call reception, the portable telephone apparatus 100 displays such a notification for indicating that the call reception is issued (step S502), and judges whether or not a data acquisition from a site is interrupted (step S503). If it has been so set that the data acquisition owns a priority, then the portable telephone apparatus 100 notifies a refusal of the call reception to the telephone calling side (step S504), and accomplishes the process operation during interruption. Then, the process operation is returned to the step S111 in the flow chart of FIG. 3, in which the acquiring operation of the data is continued.

In the case that the interrupt request does not correspond to the call reception in the step S501, the process operation is advanced to a step S505 in which the portable telephone apparatus 100 judges whether or not the interrupt request corresponds to a mail reception. In the case that this interrupt request is the mail reception, the portable telephone apparatus 100 displays such a notification for indicating that the mail reception is issued (step S606), and judges whether or not a data acquisition from a site is interrupted (step S507). If it has been so set that the data acquisition owns a priority, then the portable telephone apparatus 100 does not acquire the mail (step S508), but accomplishes the process operation during interruption. Then, the process operation is returned to the step S111 in the flow chart of FIG. 3, in which the acquiring operation of the data is continued.

In such a case that the interrupt request does not correspond to the mail reception in a step S505, the portable telephone apparatus 100 judges that the interrupt request corresponds to another interrupt request, for example, an operation of the portable telephone apparatus 100 by the user, and then, the process operation is advanced to a step S509 in which the portable telephone apparatus 100 displays such a notification for indicating that the data is now acquired from the site, and judges whether or not a data acquisition from the site is interrupted (step S520). If it has been so set that the data acquisition owns a priority, then the input operation of the operation unit 16 by the user is ceased (step S511), and accomplishes the process operation during interruption. Then, the process operation is returned to the step S111 in the flow chart of FIG. 3, in which the acquiring operation of the data is continued.

On the other hand, in the case that it has been so set that the data acquisition is interrupted when the interrupt request is issued in the step S503, the step S507, and a step S510, the portable telephone apparatus 100 interrupts the data acquisition process operation, and executes such a process operation for accepting the interrupt request (step S512). Then, the portable telephone apparatus 100 turned ON a timer by the set time duration so as to commence a time counting operation (step S513), and then, the process operation is returned to the point indicated by symbol "A" in the flow chart of FIG. 3, and thus, the process sequences are repeated from the step for judging whether or not the present time is reached to the access setting time instant. It should also be noted that the notification made when the interrupt request is issued may be displayed not only on the display unit 15, but also may be displayed in other methods, for example, voice may be produced from a speaker, and an LED may be flickered.

Figure 10:
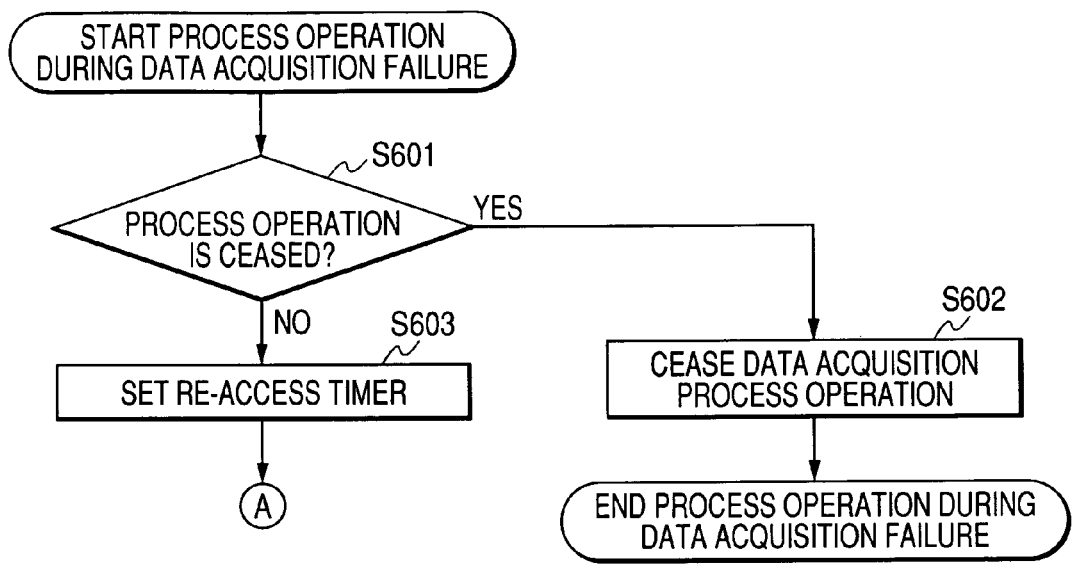
FIG. 10 is a flow chart for describing process flow operations when a data acquiring operation fails which may be automatically set by the user in the automatic cyclic-access processing operation of the portable telephone apparatus according to the present embodiment.

FIG. 10 is a flow chart for explaining flow operations as to the process operation during data acquisition failure. When a data acquisition operation is accomplished under abnormal condition and the process operation is entered to this process block, the portable telephone apparatus 100 firstly judges whether or not the data acquisition process operation is ceased to be invalidated (step S601). As the abnormal condition of the data acquisition operation, for example, a connection to a site is cut off while data is acquired. If it has been so set that the data acquisition process operation is invalidated when the data acquisition operation fails, then the portable telephone apparatus 100 ceases the data acquisition process operation (step S602), and accomplishes the process operation during data acquisition failure. On the other hand, in such a case that it has been so set that the re-accessing operation is carried out, the portable telephone apparatus 100 turns ON a timer setting operation of the re-accessing operation by the set time duration so as to commence a time counting operation (step S603), and then, the process operation is returned to the point indicated by symbol "A" in the flow chart of FIG. 3, and thus, the process sequences are repeated from the step for judging whether or not the present time is reached to the access setting time instant.

Next, in the final stage of the automatic cyclic-access setting screen, as indicated in FIG. 4(*d*), a registration screen of a site macro setting menu 3 is displayed. On this display screen, sequences as to the process operation during storage memory shortage may be set.

In such a case that a size of acquired data is larger than the empty storage capacity of the data storage unit 24, the following operation is selected. That is, the data storage operation is not carried out, or since the existing data is deleted, an empty storage capacity is increased so as to store the data. In the case that the data is deleted, an order as to sorts of data which are deleted in a priority is also selected. It should also be noted that when such an item is selected that other data are deleted and the data is stored, a list of data sorts as indicated in FIG. 4(*e*) is displayed. In this displayed list, the items as to the deletable data are sequentially selected, so that a priority order of the data deletions may be set. Since this selection is made, sequences as to the process operation during storage memory shortage as indicated in a flow chart of FIG. 11 are set.

Figure 11:
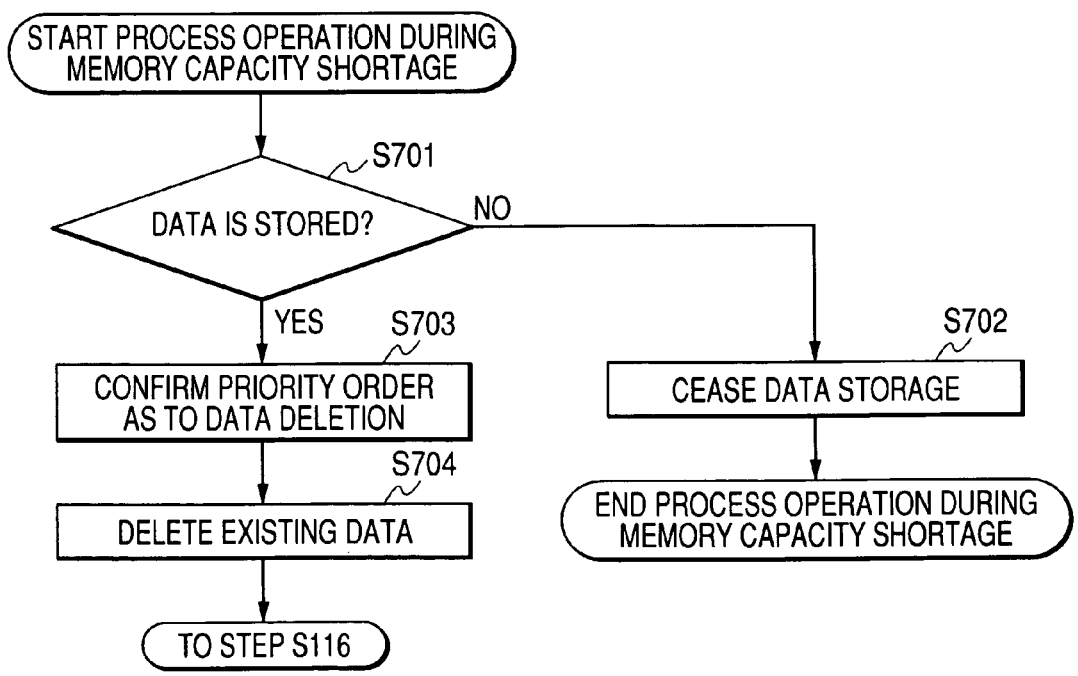
FIG. 11 is a flow chart for describing process flow operations when a shortage of a storage memory occurs which may be automatically set by the user in the automatic cyclic-access processing operation of the portable telephone apparatus according to the present embodiment.

Now, a description is made of a process block when a storage memory becomes short with reference to FIG. 11. When the portable telephone apparatus 100 judges that an empty storage capacity becomes short with respect to acquired data which is to be stored and the process operation is entered to this process block the portable telephone apparatus 100 firstly judges whether or not the acquired data is stored (step S701). If it has been so set that the acquired data is not stored when the memory storage becomes short, the portable telephone apparatus 100 ceases the data storage process operation (step S702), and accomplishes the process operation during storage memory storage. On the other hand, in the case that the data is stored, the portable telephone apparatus 100 confirms and grasps a priority order as to the deletable data (step S703), and deletes the existing data in accordance with the priority order until the empty storage capacity of the data storage unit 24 of the memory 12 exceeds the data size (step S704). Thereafter, the portable telephone apparatus 100 accomplishes the process operation during storage memory shortage, and the process operation is advanced to the step S116 of the flow chart shown in FIG. 3, in which the data is stored.

It should also be noted that the above-explained automatic cyclic-access sequential processing operations are set every arbitrary accessing subject, for instance, every site, or every group of a predetermined site. Since the automatic cyclic-access sequential process operations may be individually set based upon a site to be accessed, frequencies of automatic cyclic accessing operations and process operations when an access to a site is not allowed can be separately set. For instance, in such a case that information as to a news distribution site whose content is frequently updated is surely wanted to be acquired, it may be so set that a frequency of a cyclic-access operation is increased, and even when the portable telephone apparatus 100 cannot access the news distribution site, the portable telephone apparatus 100 repeatedly executes a re-accessing operation.

Also, in the above-described embodiment, the portable telephone apparatus 100 has been arranged by that the re-accessing operation is repeatedly carried out until the access operation can succeed. Alternatively, a total number of the re-accessing operations may be set.

Furthermore, in the case that access operations frequently fail at a time instant set by the user, the portable telephone apparatus 100 may be alternatively arranged in such a manner that while such a time instant when a re-accessing operation could succeed is stored, a subsequent access operation is commenced at the time instant when the previous access operation could succeed (namely, set time instant is corrected). As a result, for example, even in such a case that it has been so that it has been so set that an automatic cyclic-access operation is carried out in a time range where access operations to a site are concentrated, this setting operation for the access-concentrated time range may be automatically corrected, and the automatic cyclic-access operation may be set to a time range which avoids access congestion.

Figure 12:
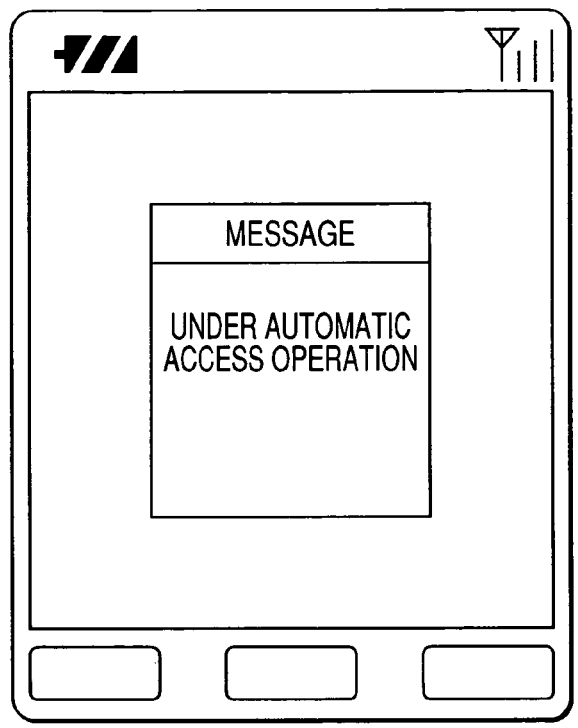
FIG. 12 is a schematic diagram for representing a display example of a notification screen while an automatic access operation is carried out, which is displayed on the display unit of the portable telephone apparatus according to the present embodiment.

Also, while the site is accessed by setting the automatic cyclic-access operation as explained above, the portable telephone apparatus 100 displays such an indication that an automatic access operation is carried out on the display unit 15 as represented in FIG. 12 so as to notify this indication to the user. It should also be noted that the notification when the automatic cyclic-access operation is carried out may be made not only by being displayed on the display unit 15, but also, by employing other methods, for instance, voice may be produced from the speaker, or the LED may be flickered.

Figure 13:
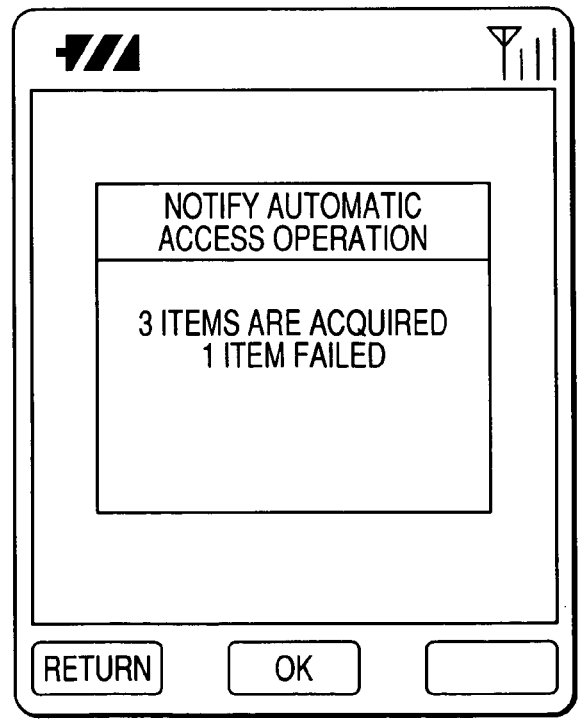
FIG. 13 is a schematic diagram for representing a display example of a notification screen as to a result obtained when the automatic access operation is carried out, which is displayed on the display unit of the portable telephone apparatus according to the present embodiment.

Alternatively, when one automatic cyclic-access operation is accomplished, such a result of the automatic access operation to a specific site as represented in FIG. 13 may be displayed on the display unit 15. Based upon such a result of the automatic cyclic-access operation, the user may grasp a total number of data which could be successfully acquired, and also a total number of data whose acquisitions failed.

Next, a description is made of viewing operation for viewing data acquired in the portable terminal apparatus of the present embodiment.

In the portable telephone apparatus of the present embodiment, if the user once sets the above-explained automatic cyclic-access operation, then subsequently when the present time is reached to the set time instant, the portable telephone apparatus automatically cyclically accesses sites, data is acquired, and a condition of the cyclically accessed results can be confirmed in the combined form on the display screen. When the user operates the operation unit 16 so as to select an acquired data viewing menu of an automatic cyclically accessing operation, an acquired data list screen is displayed on the display unit 15.

Figure 14:
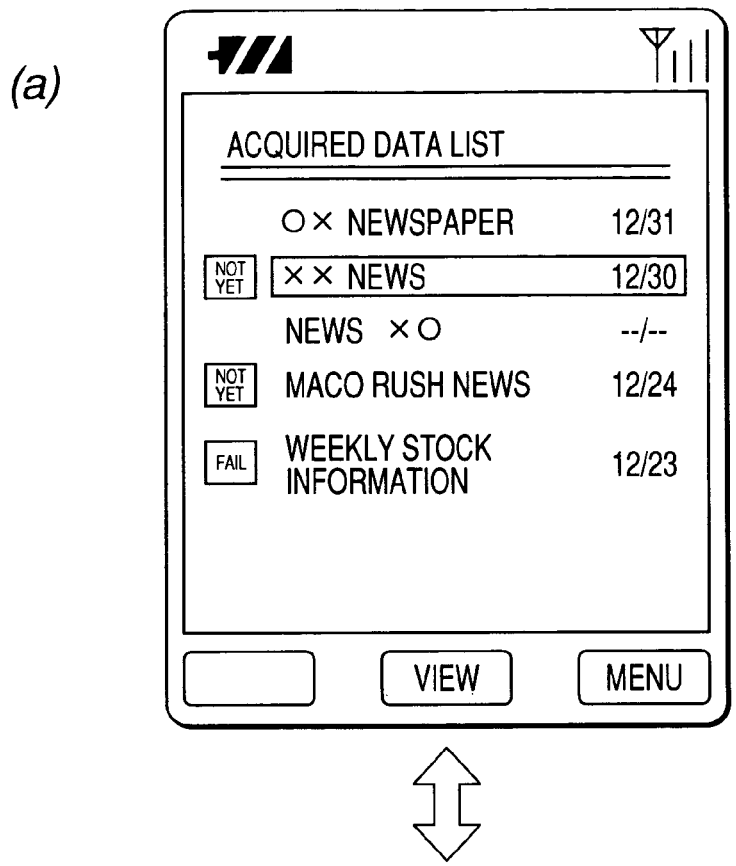
FIG. 14 is a schematic diagram for showing a first display example as to an acquired data list screen which is displayed on the display unit of the portable telephone apparatus according to the present embodiment.
Figure 14:
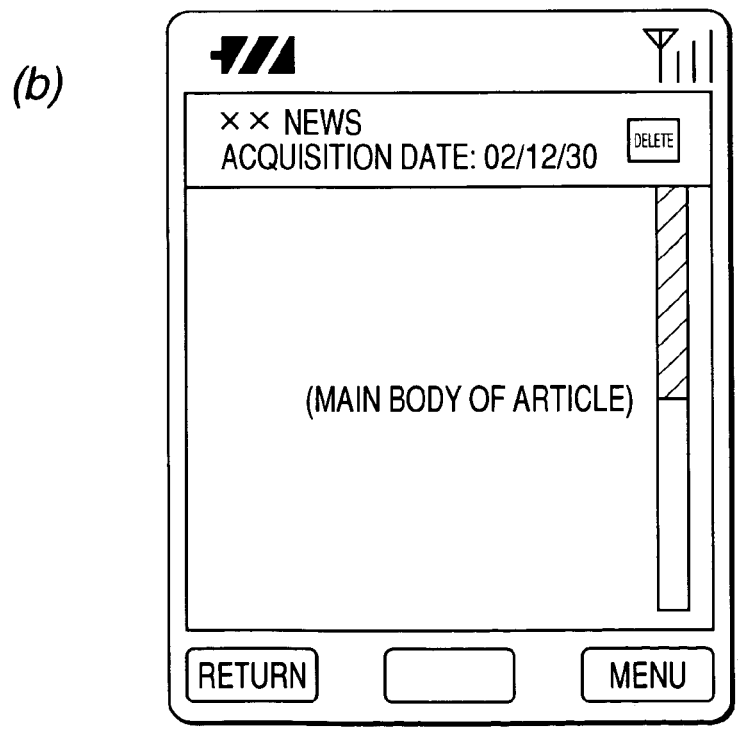
Figure 15:
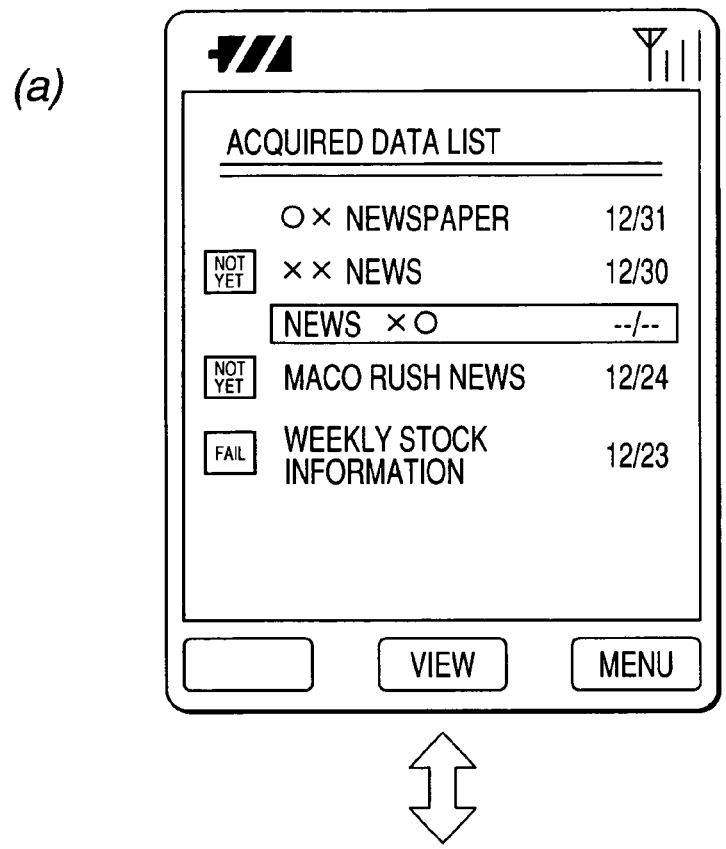
FIG. 15 is a schematic diagram for showing a second display example as to an acquired data list screen which is displayed on the display unit of the portable telephone apparatus according to the present embodiment.
Figure 15:
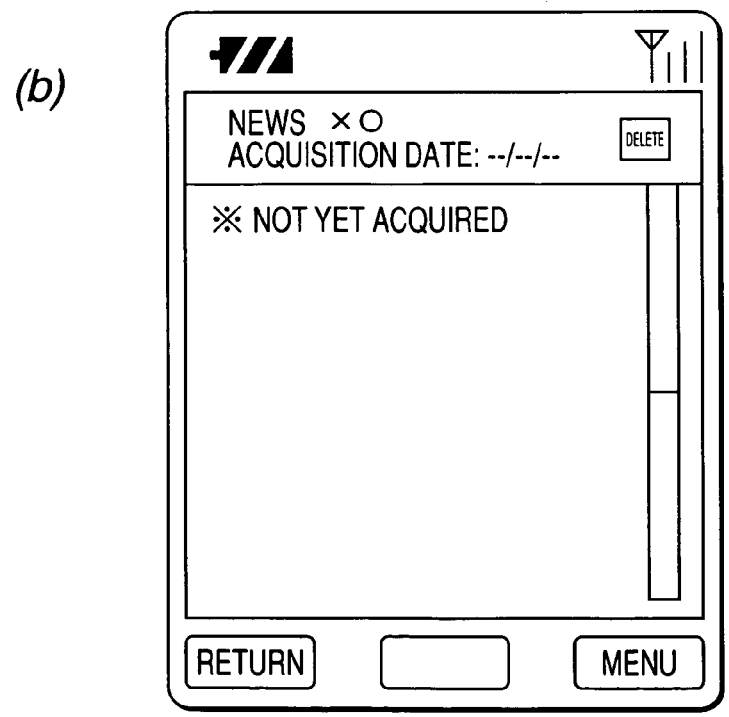
Figure 16:
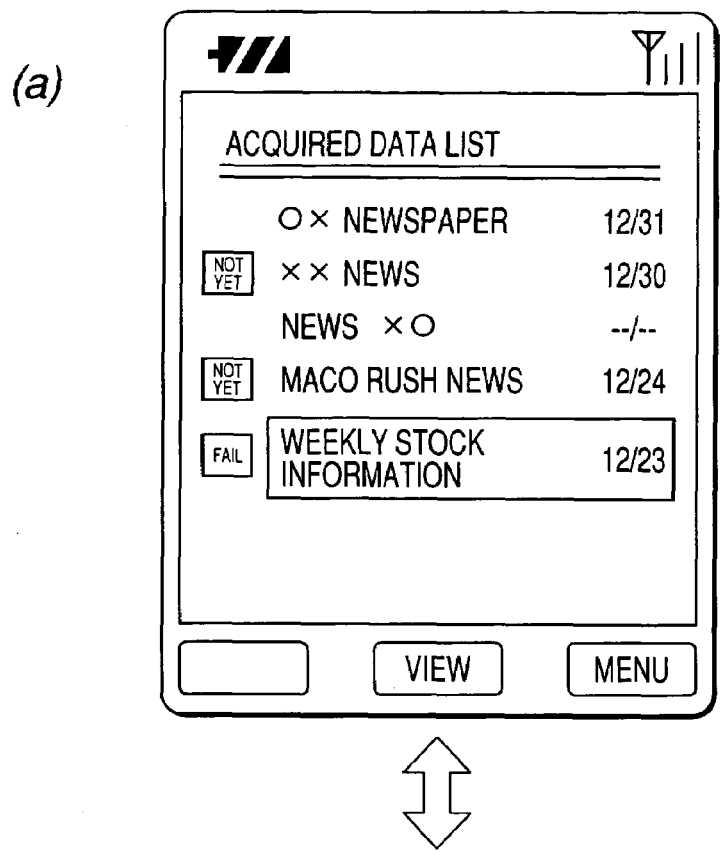
FIG. 16 is a schematic diagram for showing a third display example as to an acquired data list screen which is displayed on the display unit of the portable telephone apparatus according to the present embodiment.
Figure 16:
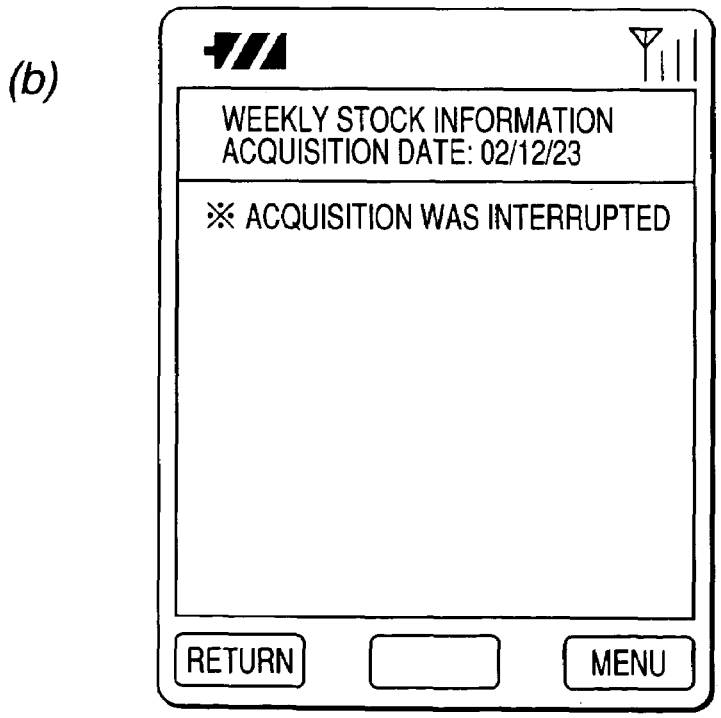

FIG. 14 to FIG. 16 are schematic diagrams for representing display examples as to the acquired data list screens displayed on the display unit 15 of the portable telephone apparatus 100.

On the acquired data list screen, names of set sites are displayed in a list form, and such icons are displayed on the left side of the site names. These icons are "not yet" for indicating that a site is not yet viewed, "fail" for representing that a data acquisition fails, and the like. Also, the latest dates when the data are acquired are indicated on the right side of the site names. When the user operates a key of the operation unit 16 so as to set a cursor to an arbitrary item of the list and pushes a view button, acquired data is displayed. In other words, similar to the reception mail list screen and the like, the acquired data list screen is constituted in such a manner that an item which is wanted to be viewed can be selected from the list, and a data content thereof can be displayed.

For instance, in FIG. 14(a), the cursor has been set to a second item "XX news" from a top item. In this item "XX news", while both a data of "December 30" and the icon of "not yet" have been displayed, data was acquired on December 30 and the acquired data is brought into a not-yet-viewed condition. If a view button is pushed under this condition, then a main content of the corresponding news article as shown in FIG. 14(b). On the other hand, in FIG. 15(a), the cursor has been set to a third item of "news X O" from a top item. As to this item "news XO", both a data acquisition date and an icon are not displayed, and the data is brought into a not-yet-acquired condition. When the view button is pushed under this condition, as indicated in FIG. 15(b), such a message that the data has not yet been acquired is displayed. Also, in FIG. 16(a), the cursor has been set to the lowest item of "weekly stock information." In this item "weekly stock information", while both a date of "December 23" and the icon of "fail" are displayed, this item implies such a condition that the data acquisition failed on December 23. When the view button is pushed under this condition, as represented in FIG. 16(b), such a message that the data acquisition was interrupted and thus failed is displayed.

As previously explained, since the data acquired from the plural sites can be anytime viewed in an easy manner by merely performing the simple operation on the list screen such a cumbersome operation can be omitted in which when the information is wanted to be confirmed, the site access operation must be carried out every site. Also, in the case that the site access operation can be carried out based upon the content set by the user every pre-determined time instant, the data can be automatically acquired to be stored. As a result, even in such a case that the portable telephone apparatus is moved to such an area where the electromagnetic waves cannot be reached, for example, an area within a train of a subway, when the information is wanted to be confirmed, the user can view anytime the latest information. Furthermore, such a problem does not occur in which when the information is wanted to be confirmed, the access operations are concentrated to the site, so that the data cannot be acquired from this site. Also, even in such a case that the empty storage capacity of the memory is small, since the unnecessary data can be deleted in accordance with the previously set priority order and the acquired data can be stored, the acquired data can be continuously updated by the latest information, and thus, the updated data can be stored.

Also, while a retrieving unit may be alternatively provided in the control unit 11 and this retrieving unit may retrieve such data which have been acquired from sites to be stored in the data storage unit 24, this retrieving unit may alternatively retrieve desirable data from the plurality of acquired data in response to an instruction issued from the user based upon either an arbitrary keyword or such a status as an acquisition date and a not-yet-read status. Then, the retrieved desirable data may be displayed on the display unit 15. Alternatively, while a data transferring unit may be provided in the control unit 11, a transfer destination has been previously set by a designation of the user, and then, the acquired data may be automatically transferred to a predetermined transfer destination based upon this set content by the data transferring unit.

It should be understood that the present invention is not limited only to the above-described embodiment, but may be realized in various sorts of modes without departing from the technical scope and spirit of the present invention. Although the above-described embodiment has exemplified such a case that the portable telephone apparatus has been employed as one example of the portable terminal apparatus, the present invention is not limited thereto, but may be applied to various sorts of portable terminal apparatus having communication functions, for instance, a PDA (Personal Digital Assistant).

As previously explained, in accordance with the present embodiment, while the sequential process operation related to the access to the site is previously and arbitrarily set by the user, the sequential process operations capable of recovering/processing system operations in the case that the failure specific to the portable terminal apparatus happens to occur, for instance, when the portable terminal apparatus is located outside the service area where the electromagnetic waves can be reached, and when the storage capacity becomes short, can be automatically carried out. As a consequence, for instance, even when the data cannot be acquired at the set time instant, since the re-accessing operation is carried out, the data may be acquired; even when the storage capacity of the memory becomes short, since the existing data is deleted, the newly acquired data can be stored, namely, also in the portable terminal apparatus for performing the wireless communication, the periodical information acquiring operation may be carried out which is substantially equivalent to the automatic cyclically accessing operation. Then, if the portable terminal apparatus is arranged in such a manner that a total number of re-accessing operations may be previously and arbitrarily set, then the executions of the re-accessing operations are accomplished based upon this set time and the periodical accessing operation may be subsequently carried out. As a result, the entire access frequency may be suppressed, and thus, the total communication cost may be reduced by this suppressed access frequency.

Also, since the access operation to the designated site and the data acquisition/storage operations are automatically carried out in a predetermined time period, such a cumbersome operation that every time the data is viewed, the site is selected to be accessed is no longer required. Also, when the user wants to confirm the information, the user can always view the latest information in the simple operation irrespective of such a condition as to whether or not the portable terminal apparatus is communicatable (namely whether or not portable terminal apparatus can access target site). Furthermore, since the information acquired from the plural sits is displayed on the menu screen in the list form and the content can be viewed by merely selecting the item, the user can readily confirm the information as to the plural sites.

While the present invention has been described in detail, or with reference to the specific embodiment, it is obvious to the ordinarily skilled person that the present invention may be changed and modified in various manners without departing from the technical scope and spirit of the present invention.

The present patent application has been made based upon Japanese Patent Application No. 2002-348218 filed on Nov. 29, 2002, and the contents of which are incorporated hereinto as references.

INDUSTRIAL APPLICABILITY

As previously described, in accordance with the present invention, since the sequential process operation related to the access to the site on the network is previously set by the user, such a portable terminal apparatus can be provided. That is, while the process sequences capable of recovering/processing system operations in the case that the failure specific to the portable terminal apparatus happens to occur, for instance, when the portable terminal apparatus is located outside the service area where the electromagnetic waves can be reached, and when the storage capacity becomes short, can be automatically carried out, the information can be acquired even in the portable terminal apparatus for performing the wireless communication by executing the automatic cyclically accessing operation every predetermined time instant, and can easily acquire the desirable information when this information is required.

This invention claimed is:

1. A portable terminal apparatus, comprising:
a network access unit that accesses a site on a network so as to acquire data;
a data storage unit that stores the acquired data thereinto;
an accessing process sequence setting unit capable of arbitrarily setting an access setting condition relating to the access to the site on the network in response to an instruction of a user, the access setting condition containing an access destination, a time instant, and a processing sequence;
an accessing process sequence storage unit that stores a series of processing sequences based upon the set access setting condition; and
an accessing process executing unit that executes a predetermined processing sequence to perform an accessing process operation to the set site in accordance with the access setting condition when the present time is reached to a preset time instant,
wherein the accessing process sequence setting unit sets a processing sequence in at least one of an access starting process sequence for starting an access operation to the set site at the preset time instant, a data acquiring process sequence for acquiring data from the accessed set site, and a data storing process sequence for storing the acquired data into the data storage unit, and
wherein the accessing process sequence setting unit determines whether to stop acquiring data from the accessed set site automatically based upon the process sequences set by the user when the own apparatus accepts an interrupt request related to other use, while data is acquired from the accessed set site in the data acquiring process sequence.

2. The portable terminal apparatus as set forth in claim 1 wherein:
the accessing process sequence setting unit sets a process sequence during out of service area in the case that the own apparatus is located outside the service area where communications can be performed, when an access operation to the set site is commenced in the access starting process sequence.

3. A portable terminal apparatus, comprising:
a network access unit that accesses a site on a network so as to acquire data;
a data storage unit that stores the acquired data thereinto;
an accessing process sequence setting unit capable of arbitrarily setting an access setting condition relating to the access to the site on the network in response to an instruction of a user, the access setting condition containing an access destination, a time instant, and a processing sequence;
an accessing process sequence storage unit that stores a series of processing sequences based upon the set access setting condition; and
an accessing process executing unit that executes a predetermined processing sequence to perform an accessing process operation to the set site in accordance with the access setting condition when the present time is reached to a preset time instant,
wherein the accessing process sequence setting unit sets a processing sequence in at least one of an access starting process sequence for starting an access operation to the set site at the preset time instant, a data acquiring process sequence for acquiring data from the accessed set site, and a data storing process sequence for storing the acquired data into the data storage unit,
wherein the accessing process sequence setting unit determines whether to stop acquiring data from the set site when an access operation to the set site is commenced in the access starting process sequence, while the own apparatus is under use since the own apparatus executes another task related to other use.

4. The portable terminal apparatus as set forth in claim 1 wherein:
the accessing process sequence setting unit sets a process sequence during site access failure in the case that the accessing operation is failed, when the set site is accessed in the data acquiring process sequence.

5. The portable terminal apparatus as set forth in claim 1 wherein:
the accessing process sequence setting unit sets a process sequence during data acquisition failure in the case that the own apparatus fails to acquire the data, when data is acquired from the accessed set site in the data acquiring process sequence.

6. The portable terminal apparatus as set forth in claim 1 wherein:
the accessing process sequence setting unit sets a process sequence during storage memory shortage in the case that a storage capacity of the data storage unit becomes short, when the acquired data is stored in the data storing process sequence.

7. The portable terminal apparatus as set forth in claim 1 further comprising a retrieving unit that retrieves the acquired data stored in the data storage unit.

8. The portable terminal apparatus as set forth in claim 1 wherein:
the accessing process sequence setting unit is capable of setting a transfer destination to which the acquired data is transferred; and
the portable terminal apparatus further comprises a data transferring unit that transfers the acquired data to the set transfer destination.

* * * * *